(12) United States Patent
Kerr

(10) Patent No.: US 6,669,594 B2
(45) Date of Patent: *Dec. 30, 2003

(54) COPLANAR REVERTED GEAR TRAIN LOOP

(75) Inventor: John Hugh Kerr, Kingston (CA)

(73) Assignee: Ker-Train Holdings Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/116,036

(22) Filed: Apr. 5, 2002

(65) Prior Publication Data

US 2002/0108832 A1 Aug. 15, 2002

Related U.S. Application Data

(62) Division of application No. 09/639,878, filed on Aug. 17, 2000, now Pat. No. 6,418,810, which is a division of application No. 09/184,957, filed on Nov. 3, 1998, now Pat. No. 6,126,566.
(60) Provisional application No. 60/064,129, filed on Nov. 3, 1997.

(51) Int. Cl.[7] ................................................. F16H 3/70
(52) U.S. Cl. .................. 475/173; 192/48.91; 192/66.21
(58) Field of Search ............................ 192/18 R, 18 A, 192/48.9, 48.91, 87.14, 87.15, 87.16, 87.17, 91 A, 66.21, 66.22, 66.23; 475/169, 173

(56) References Cited

U.S. PATENT DOCUMENTS

| 566,508 | A | * | 8/1896 | Esty | .................... | 192/66.21 |
|---|---|---|---|---|---|---|
| 773,227 | A | | 10/1904 | Robinson | | |
| 1,134,981 | A | * | 4/1915 | Tibbits | ................ | 192/48.91 X |
| 1,187,849 | A | | 6/1916 | Landis | | |
| 1,502,787 | A | | 7/1924 | Laukhuff | | |
| 1,619,127 | A | | 3/1927 | Jeffries | | |
| 1,620,854 | A | | 3/1927 | Ahlm | | |

(List continued on next page.)

FOREIGN PATENT DOCUMENTS

| DE | 709 599 | 8/1941 |
|---|---|---|
| DE | 1 575 003 | 3/1966 |
| EP | 0 292 559 | 10/1986 |
| GB | 1051359 | 12/1966 |

*Primary Examiner*—Richard M. Lorence
(74) *Attorney, Agent, or Firm*—Gowling Lafleur Henderson LLP

(57) ABSTRACT

A variable-ratio gear assembly comprising an input shaft, an output shaft, and at least two intercoupled independently-variable coplanar reverted gear train loops coupled to the input and output shaft. Each coplanar reverted gear train loop comprises a torque input member, a torque output member and a reactive member. A clutch is coupled to the coplanar reverted gear train loops for independently switching at least two of the members from coupling to one of the casing of the gear assembly, the input shaft and the output shaft to coupling to another of the casing, the input shaft and the output shaft for varying the velocity ratio of the coplanar reverted gear train loops.

2 Claims, 30 Drawing Sheets

U.S. PATENT DOCUMENTS

| | | |
|---|---|---|
| 1,773,526 A | 8/1930 | Engelhardt |
| 1,836,555 A | 12/1931 | Ryder |
| 1,885,156 A | 11/1932 | Thomas et al. |
| 1,892,616 A | 12/1932 | Henroid |
| 2,005,167 A | 6/1935 | Roeder |
| 2,026,880 A | 1/1936 | Fliesberg et al. |
| 2,472,452 A * | 6/1949 | Wissman .................. 192/18 A |
| 2,559,337 A * | 7/1951 | Balmforth ............ 192/87.15 X |
| 2,648,990 A * | 8/1953 | Hindmarch .......... 192/87.15 X |
| 2,990,724 A | 7/1961 | Anderson et al. |
| 3,077,125 A | 2/1963 | Louton, Jr. et al. |
| 3,727,731 A * | 4/1973 | Selig ....................... 192/18 A |
| 3,860,101 A | 1/1975 | De Feo et al. |
| 4,014,224 A | 3/1977 | Pitts |
| 4,071,940 A * | 2/1978 | Hazelton ............... 192/18 A X |
| 4,341,294 A | 7/1982 | Kerr |
| 4,559,848 A | 12/1985 | Kerr |
| 4,656,882 A | 4/1987 | Kerr |
| 4,793,215 A | 12/1988 | Sugano |
| 4,819,510 A | 4/1989 | Murakami |
| 4,825,726 A | 5/1989 | Schofield |
| 5,030,184 A | 7/1991 | Rennerfelt |
| 5,101,678 A | 4/1992 | Inui |
| 5,123,883 A | 6/1992 | Fukaya |
| 5,918,508 A | 7/1999 | Ishikawa |
| 6,126,566 A * | 10/2000 | Kerr .......................... 475/173 |
| 6,167,783 B1 | 1/2001 | Ishikawa |

\* cited by examiner

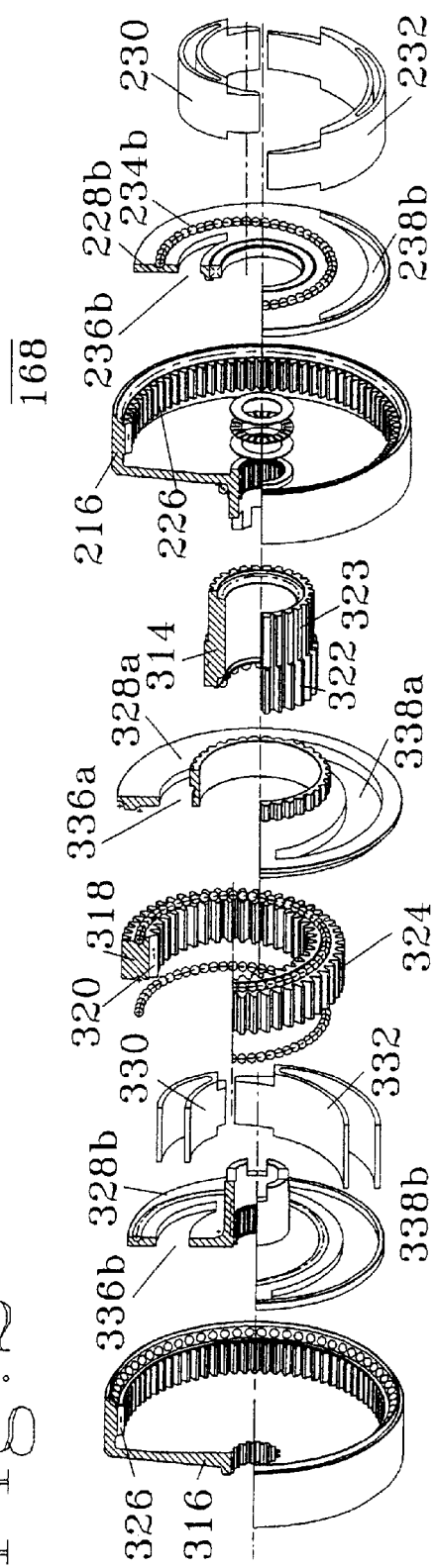
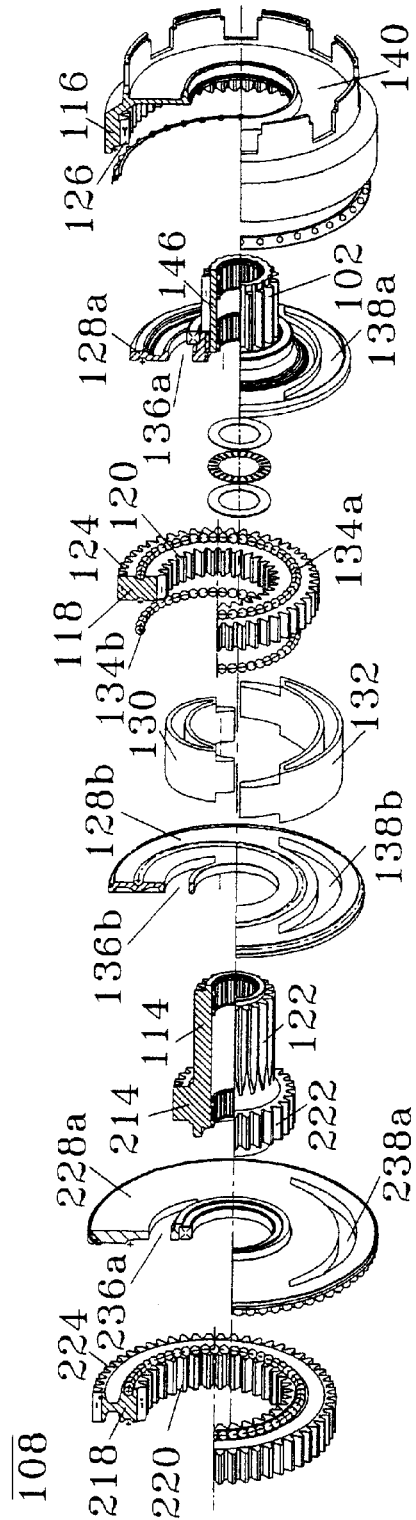
Fig. 2

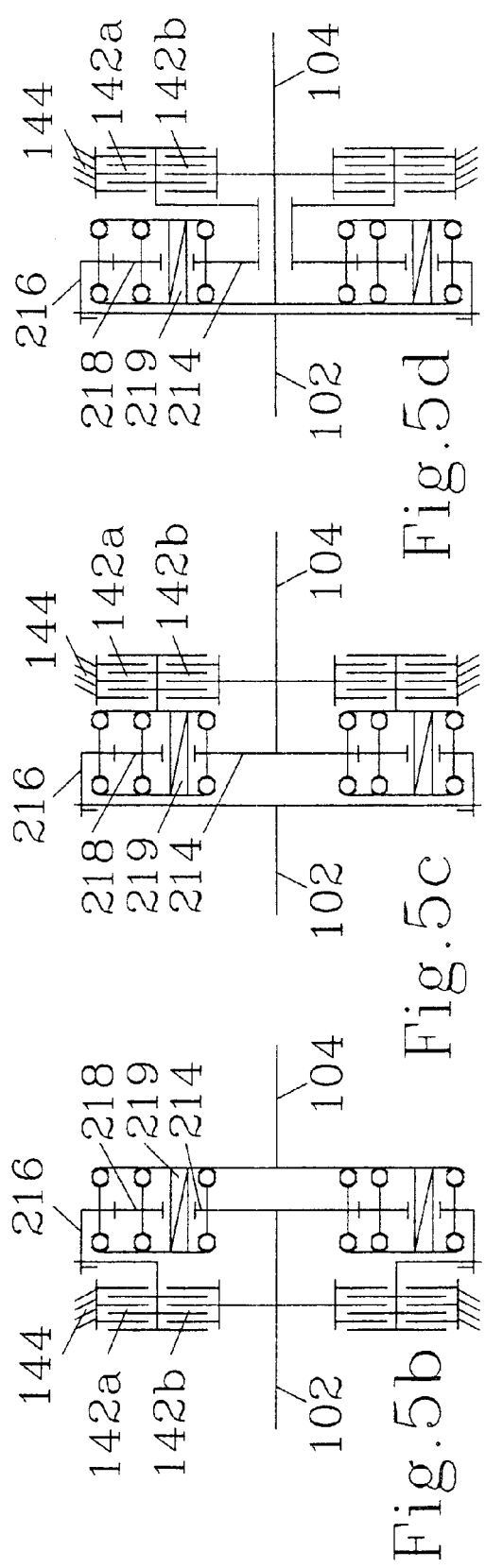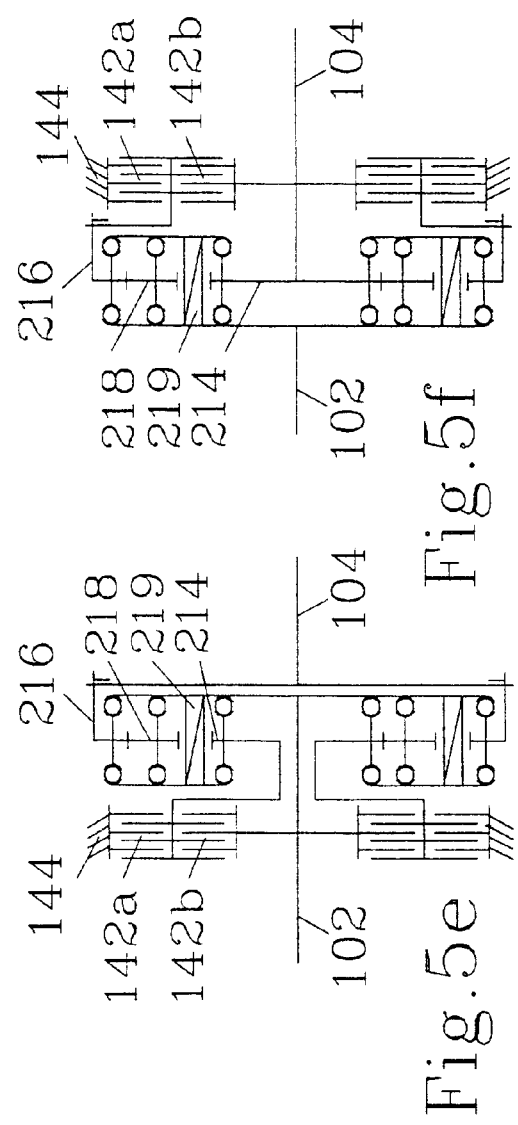

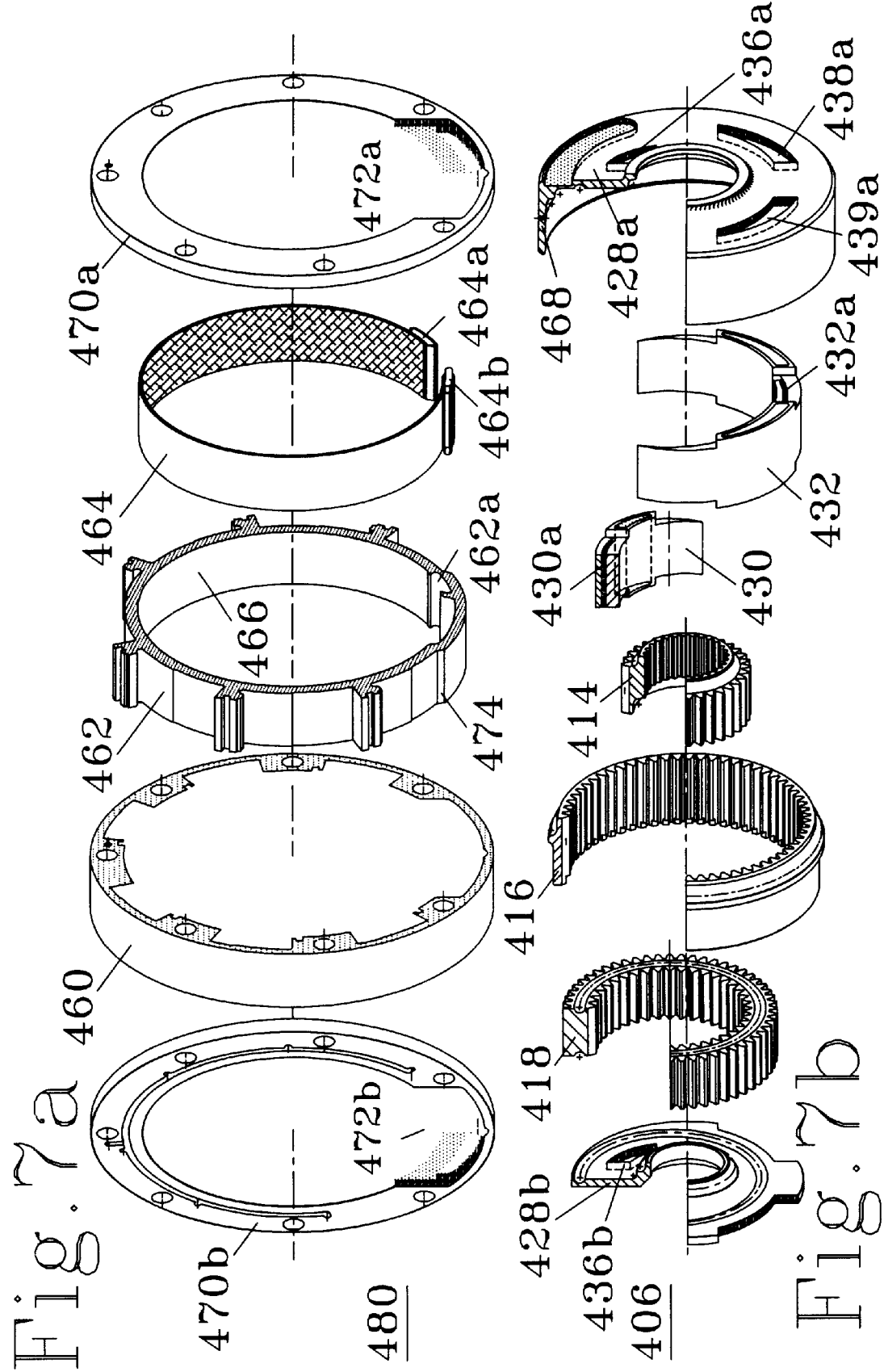

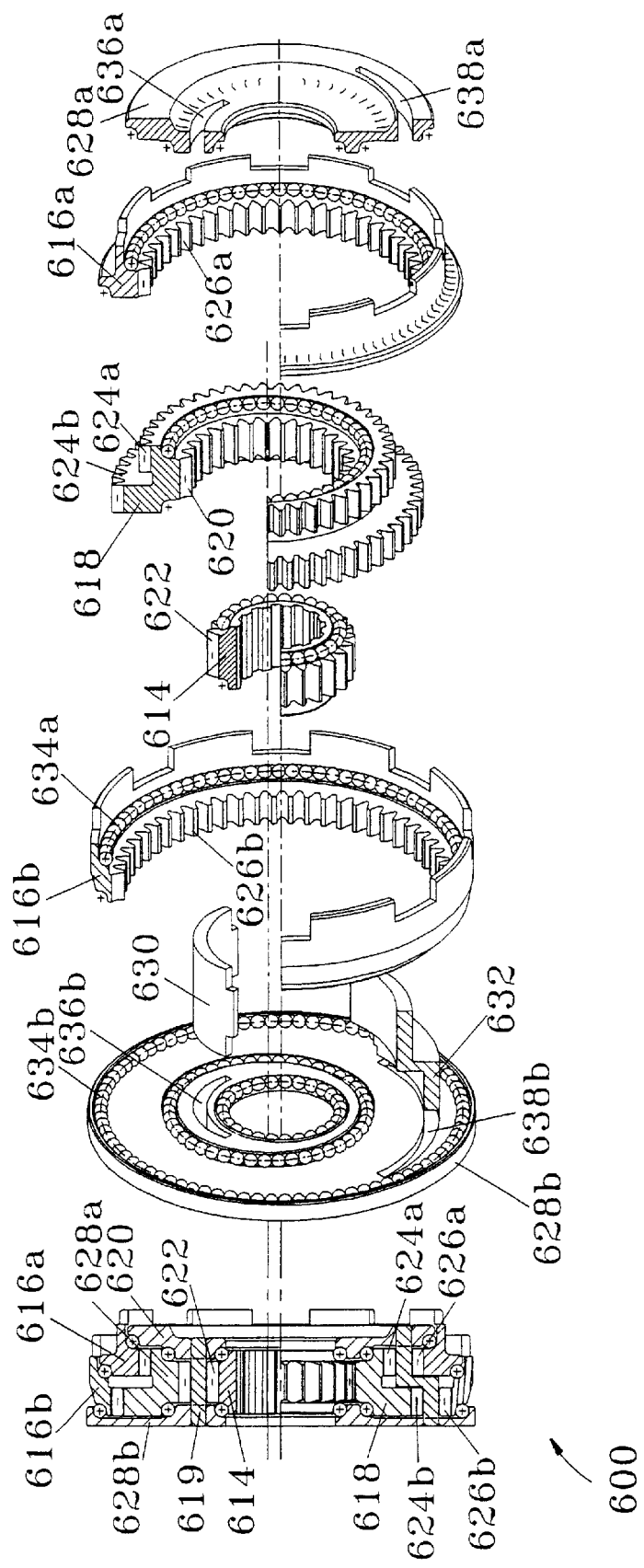

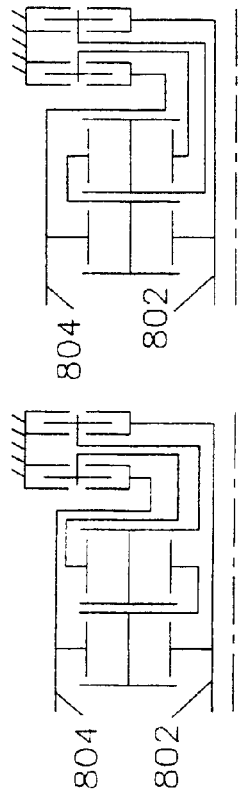
Fig.12.1:1  Fig.12.1:4  Fig.12.2:1  Fig.12.2:4
Fig.12.1:2  Fig.12.1:5  Fig.12.2:2  Fig.12.2:5
Fig.12.1:3  Fig.12.1:6  Fig.12.2:3  Fig.12.2:6

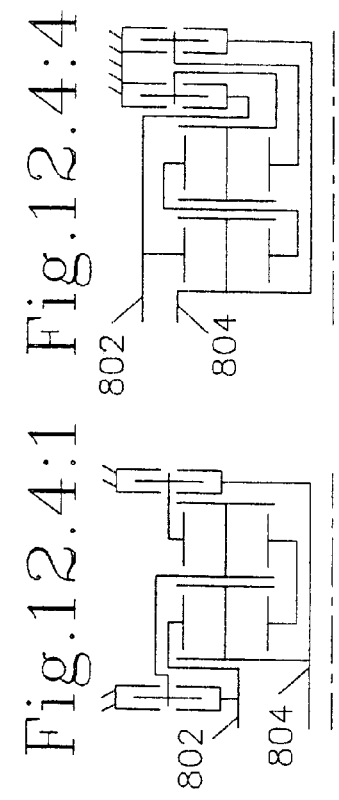# Fig.12.3:1 Fig.12.4:1 Fig.12.4:4
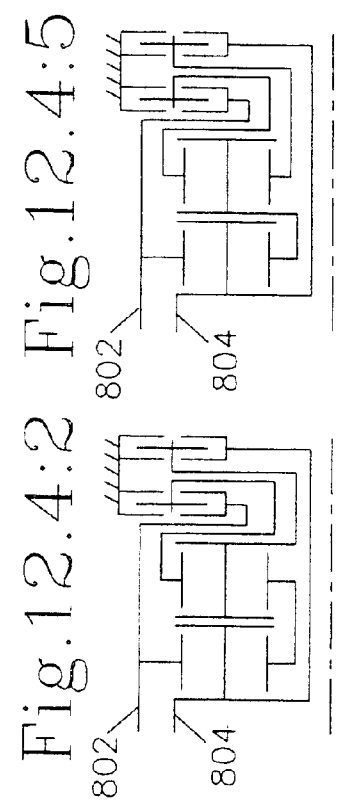# Fig.12.3:2 Fig.12.4:2 Fig.12.4:5
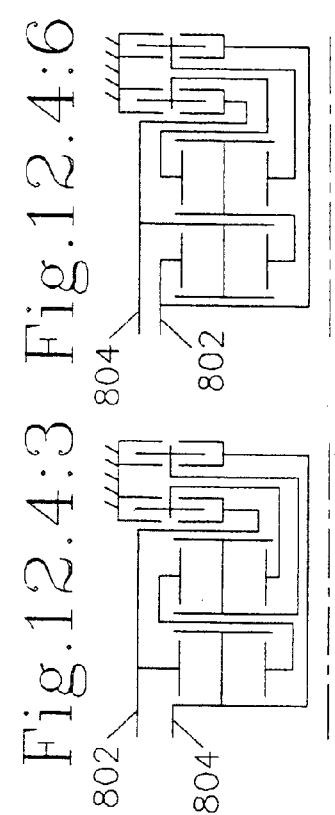# Fig.12.3:3 Fig.12.4:3 Fig.12.4:6
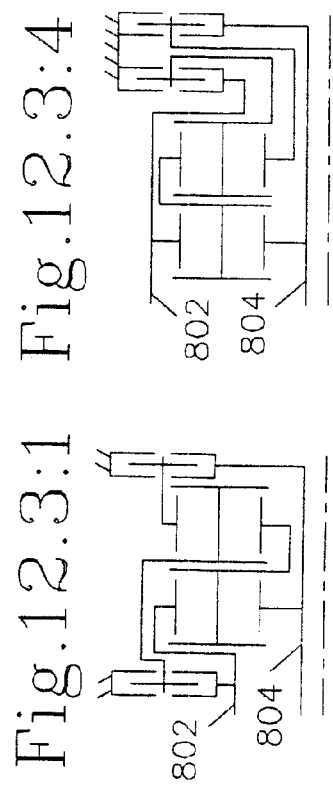# Fig.12.3:4
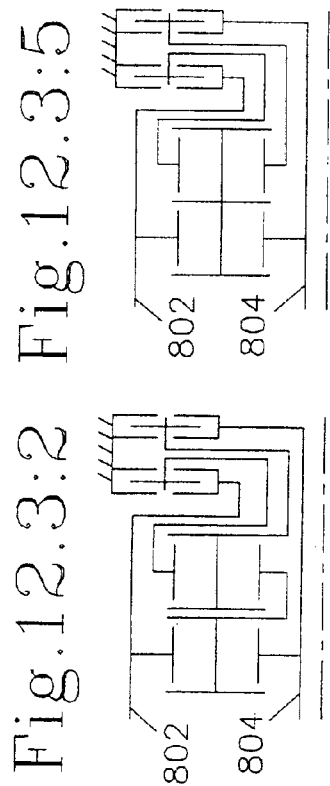# Fig.12.3:5
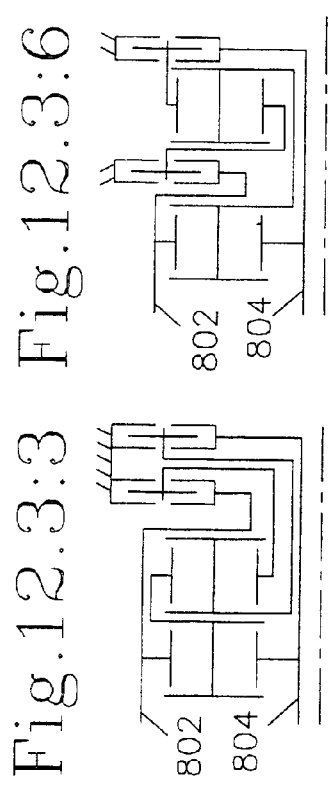# Fig.12.3:6

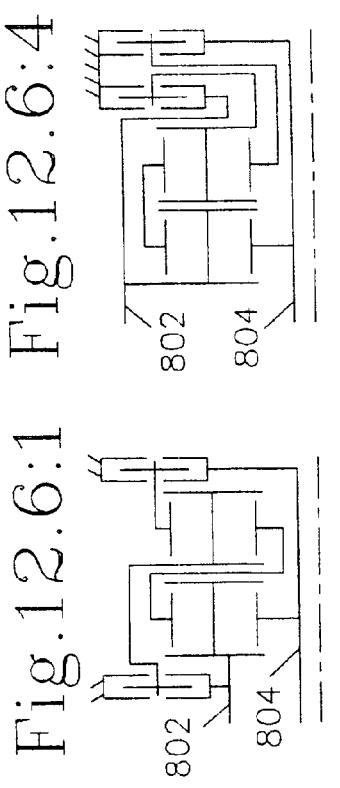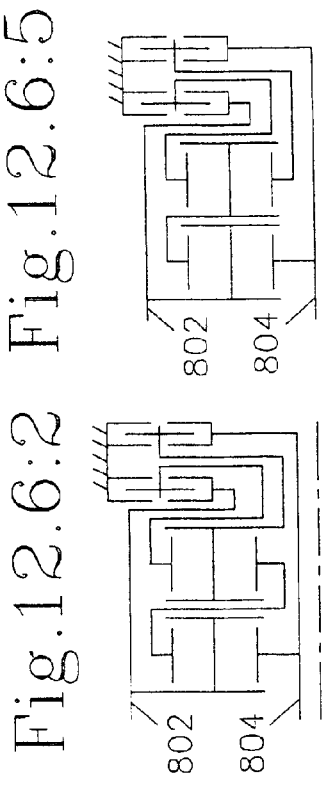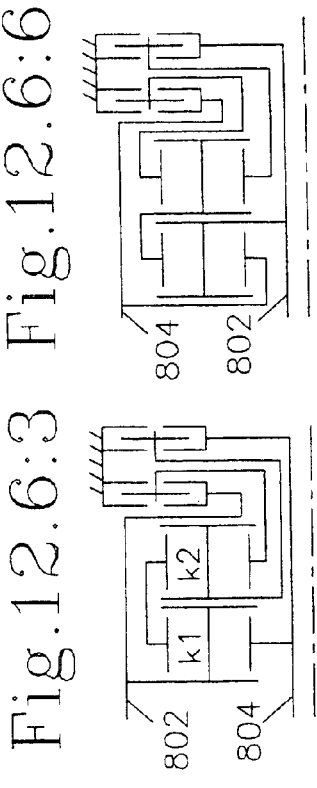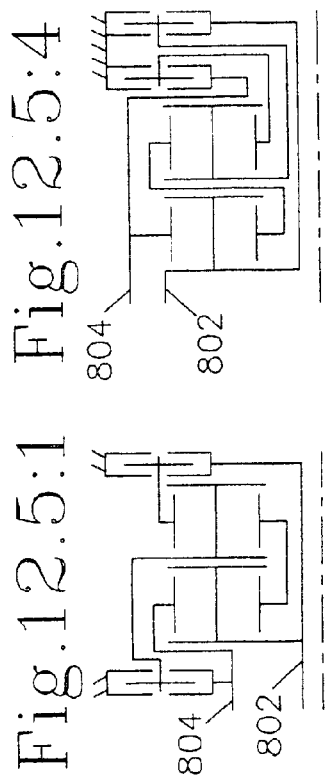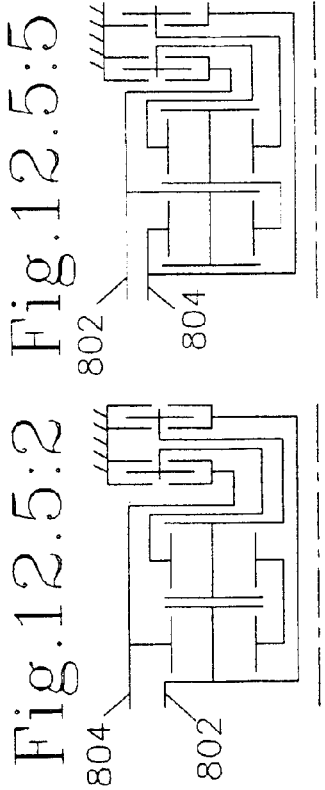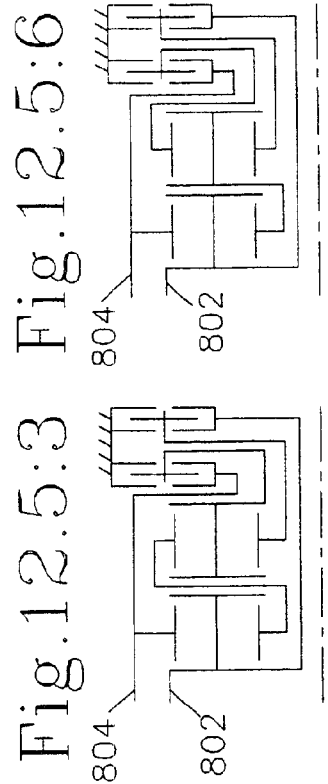

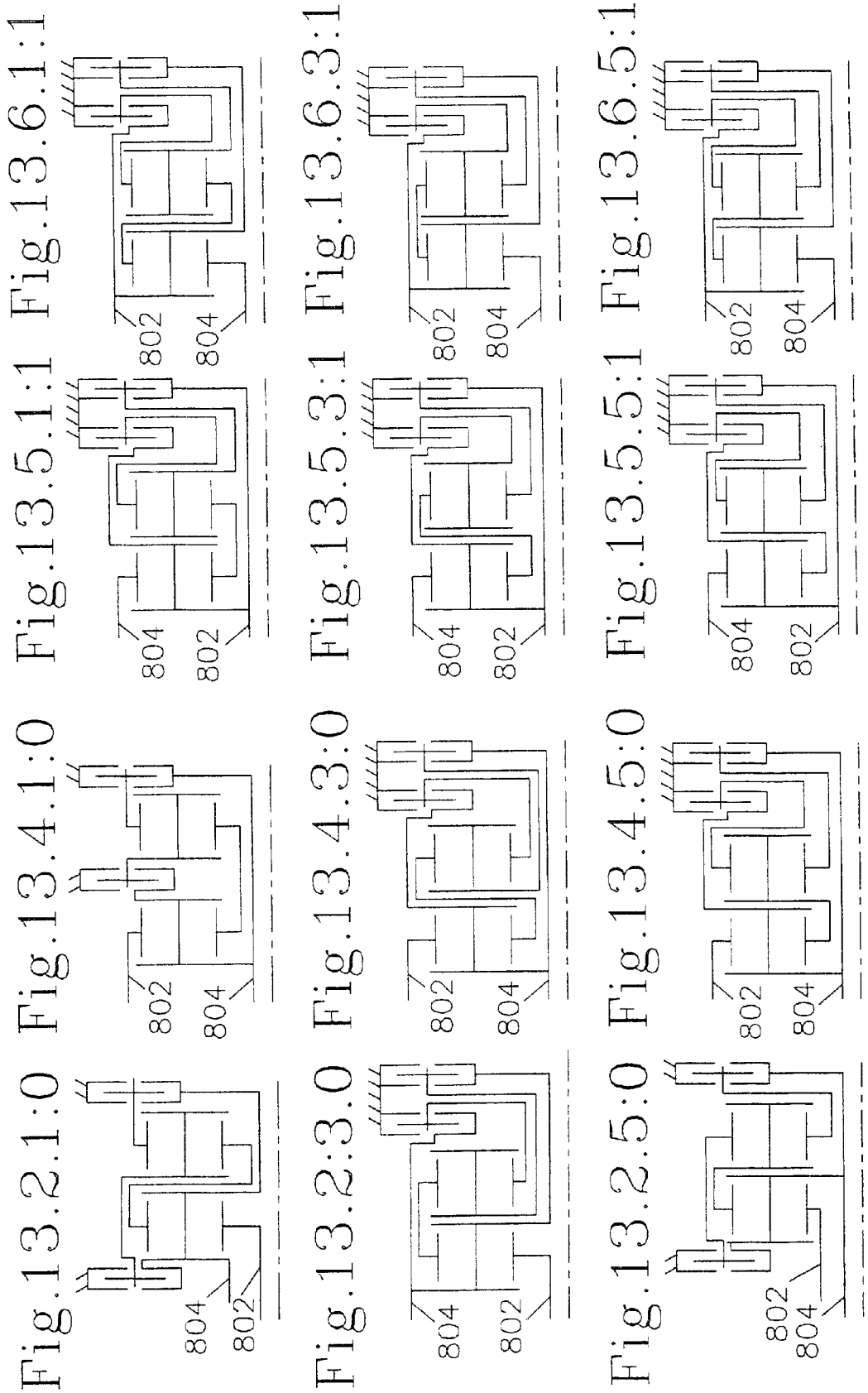

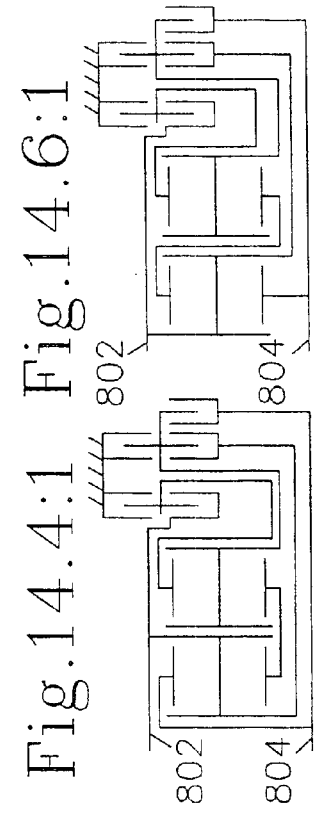
Fig.14.2:1  Fig.14.4:1  Fig.14.6:1
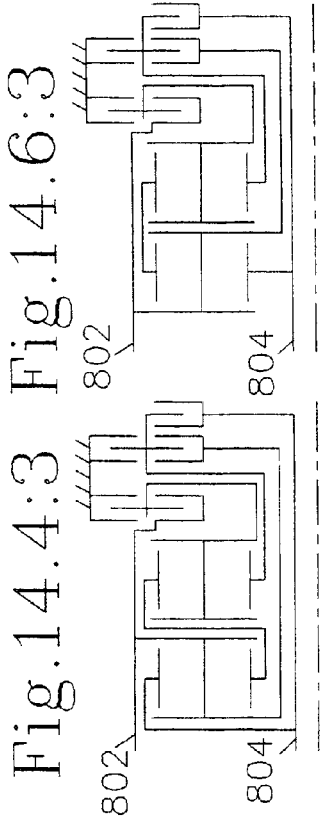
Fig.14.2:3  Fig.14.4:3  Fig.14.6:3
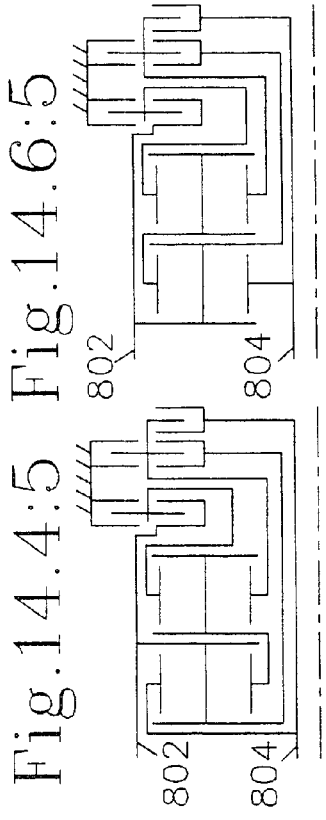
Fig.14.2:5  Fig.14.4:5  Fig.14.6:5
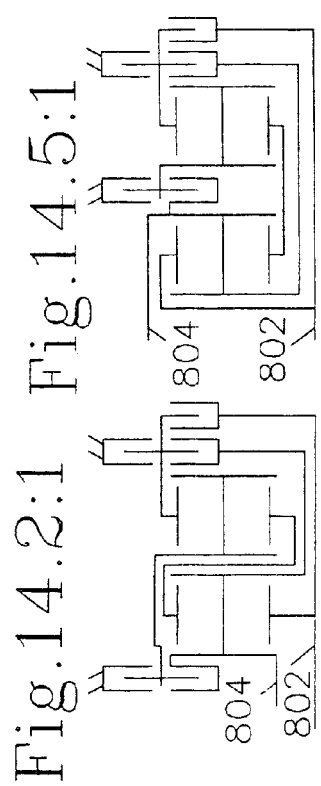
Fig.14.5:1
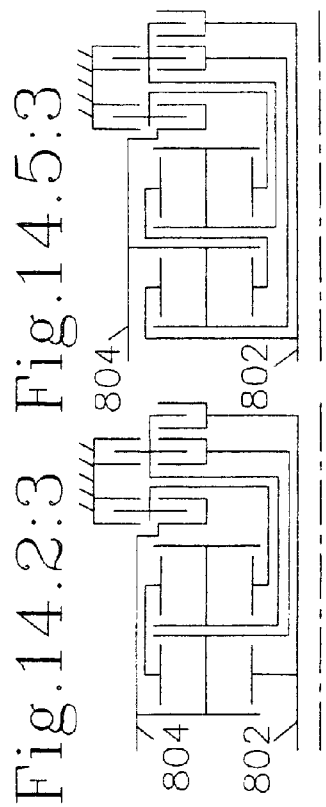
Fig.14.5:3
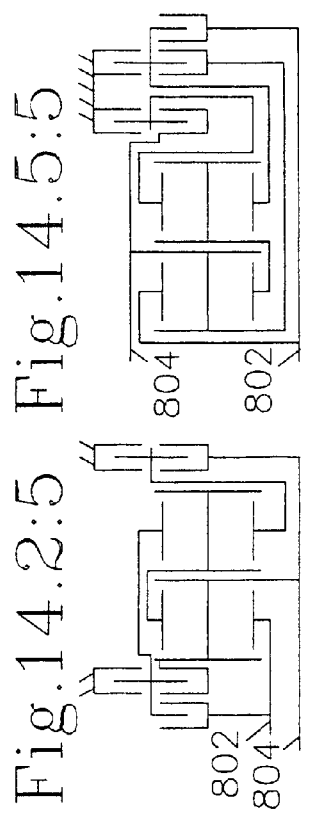
Fig.14.5:5

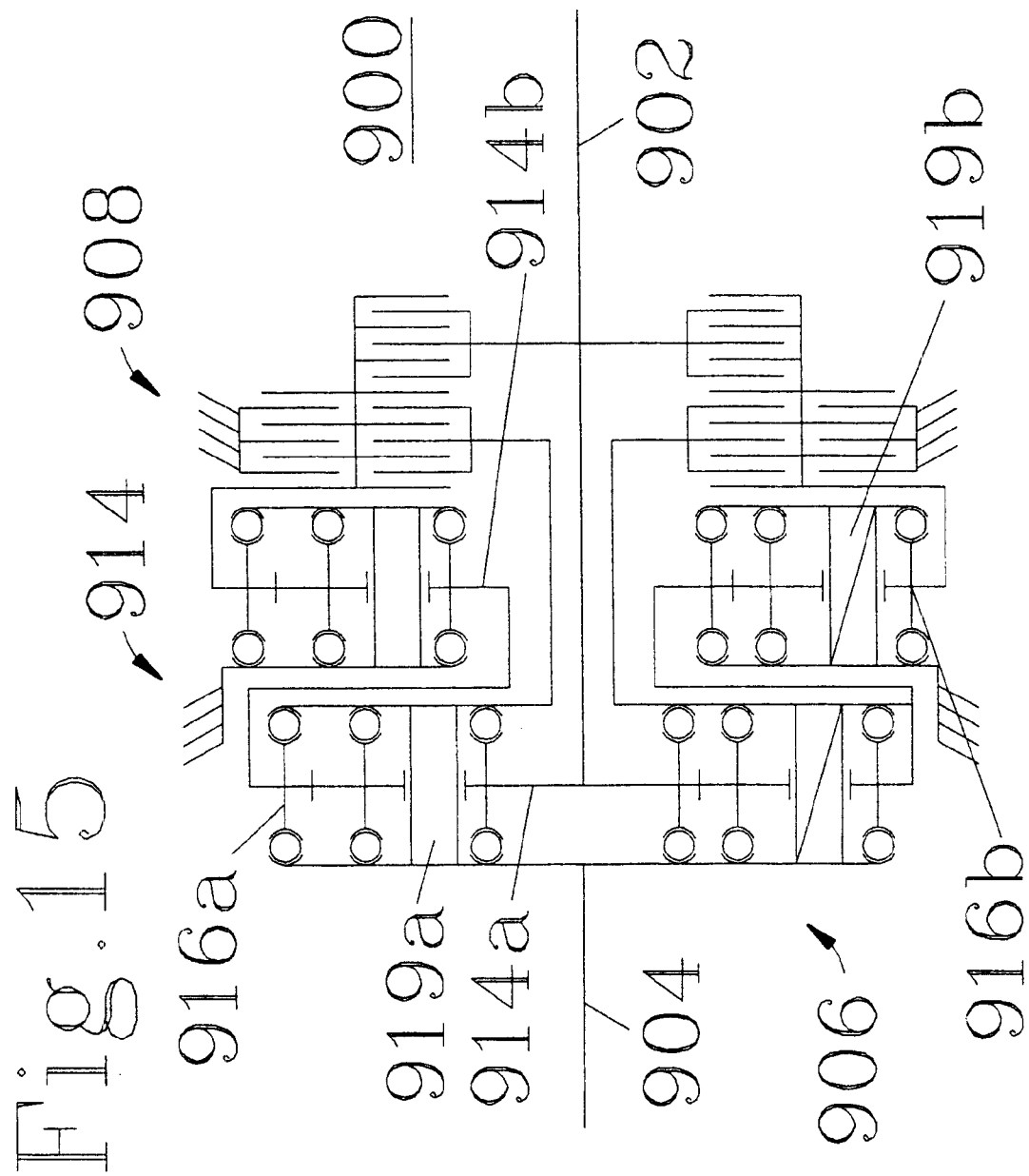

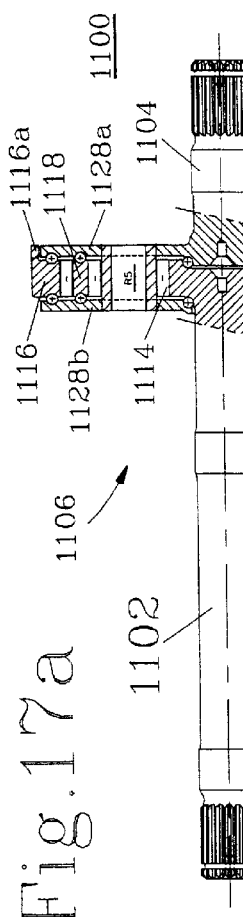
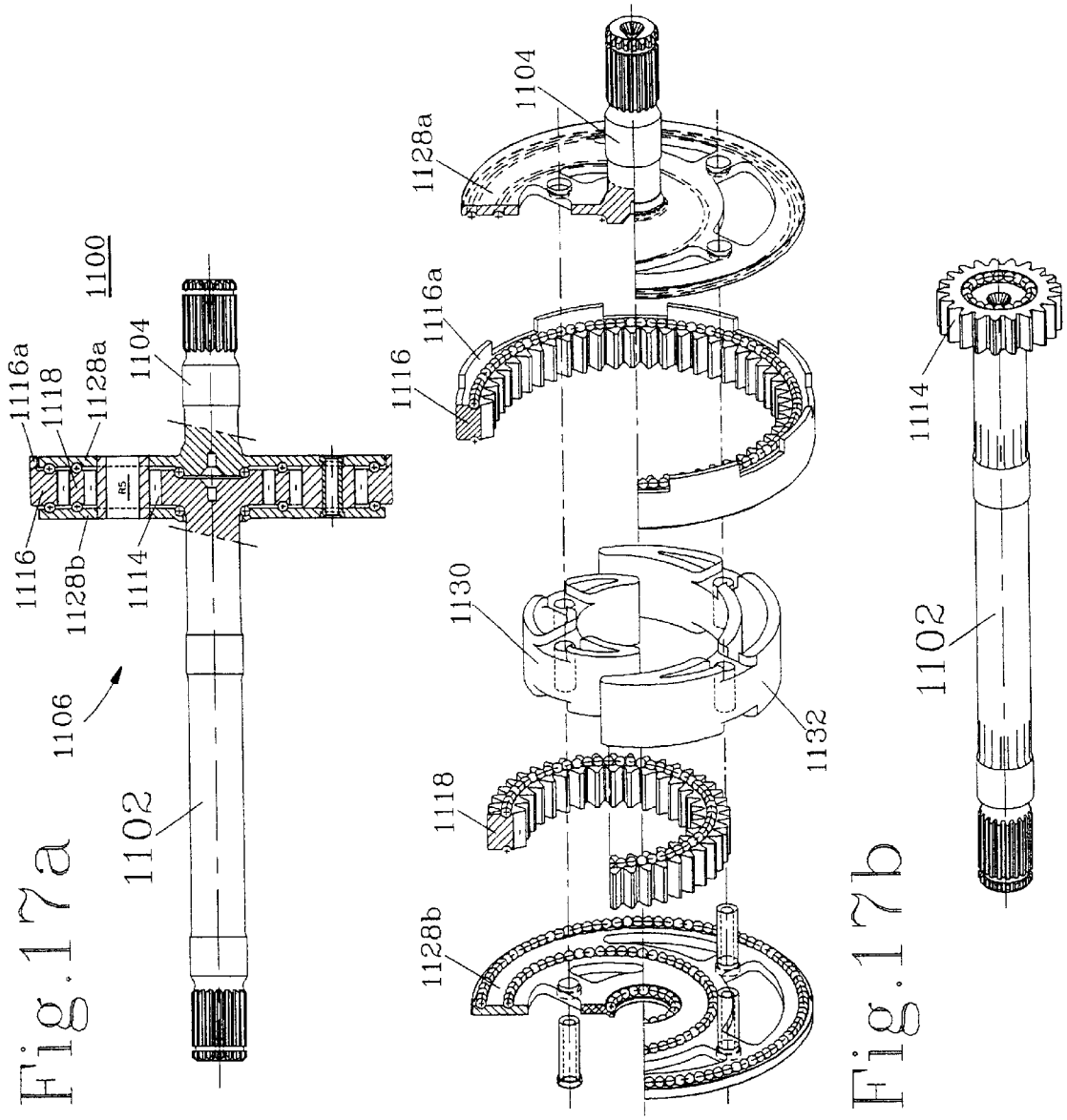
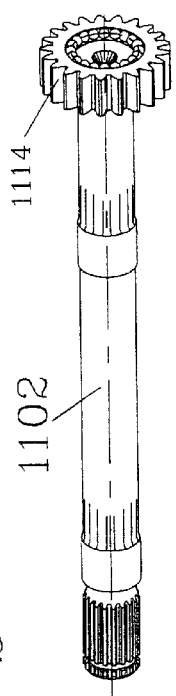
Fig.17a
Fig.17b

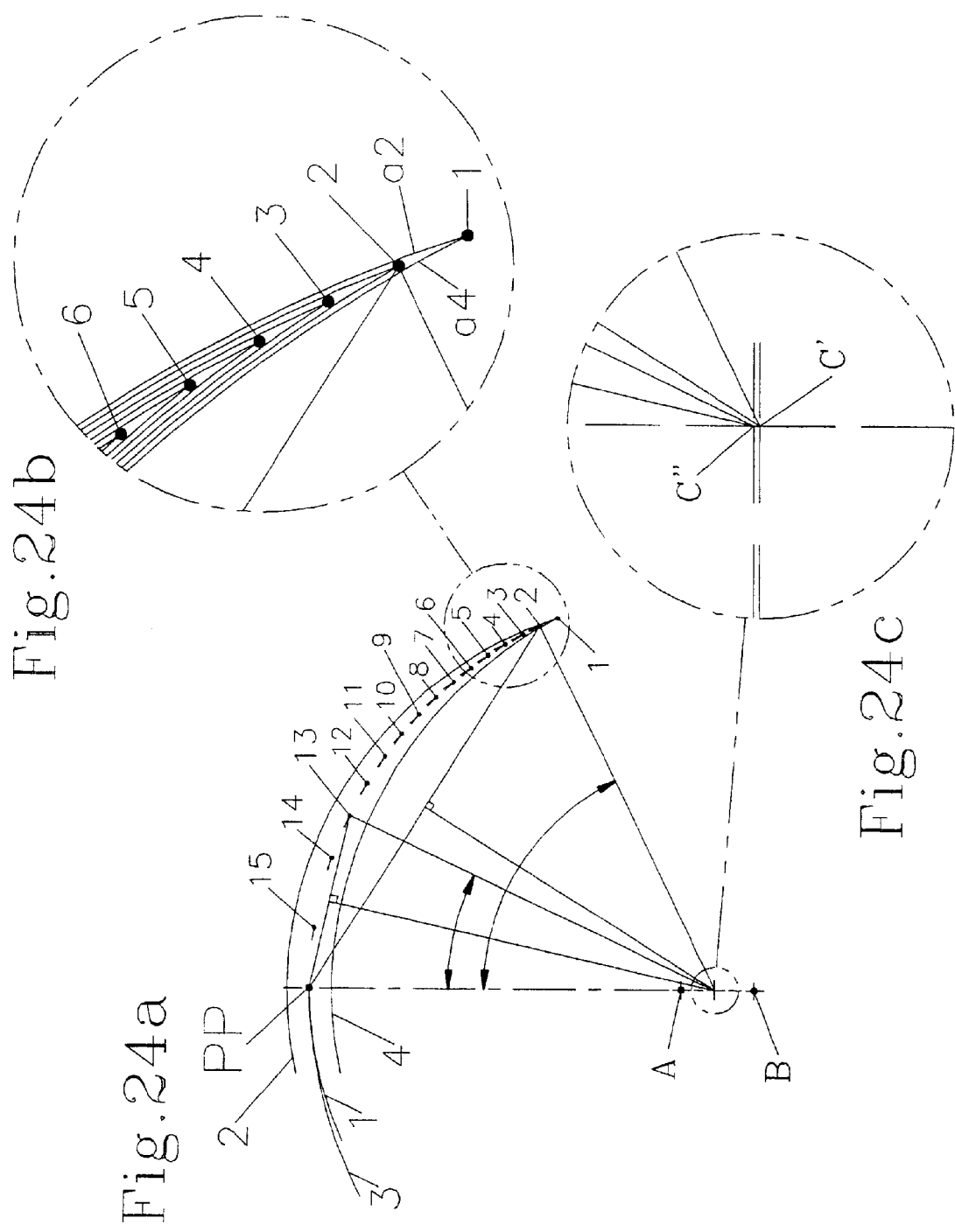

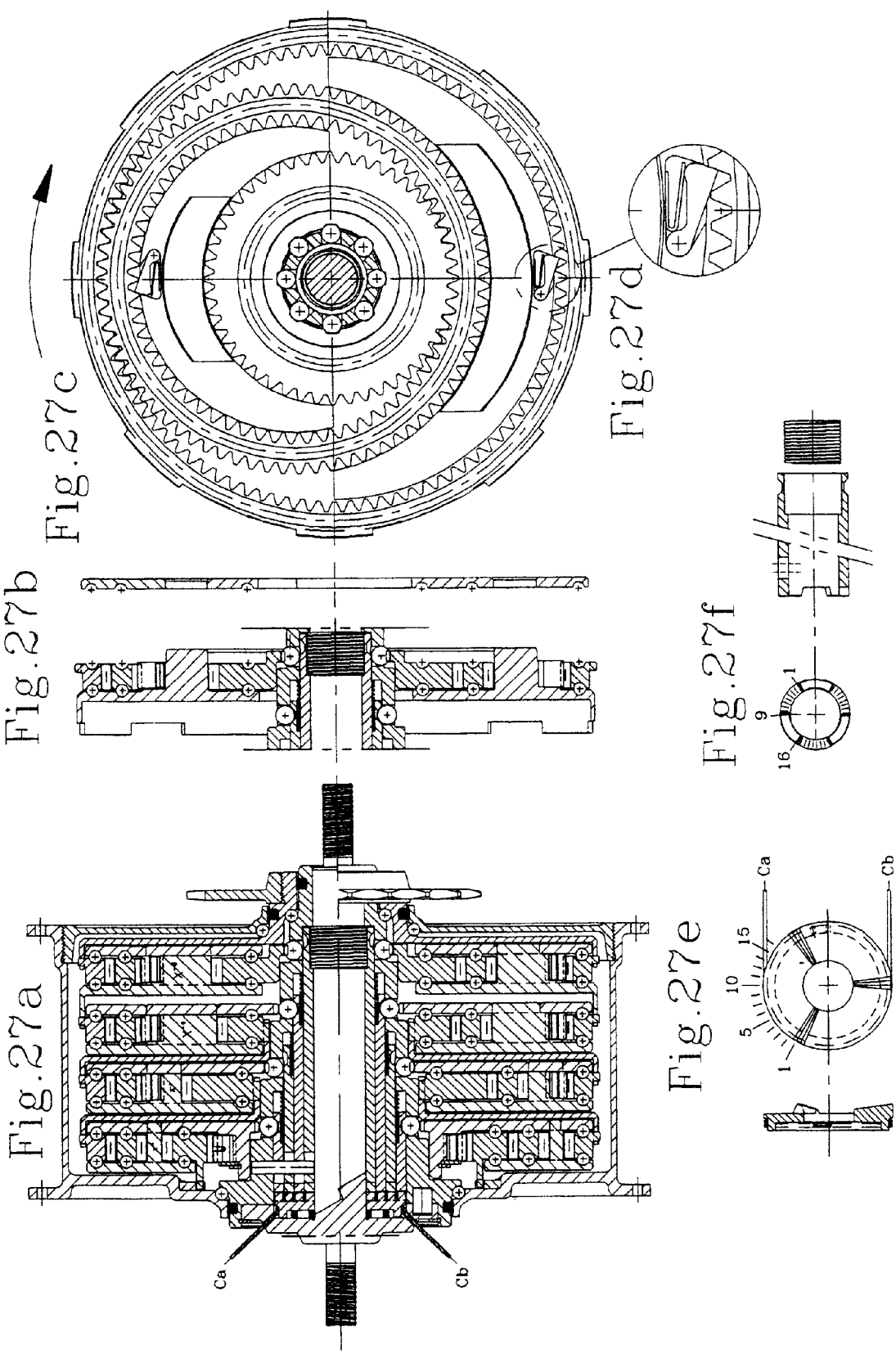

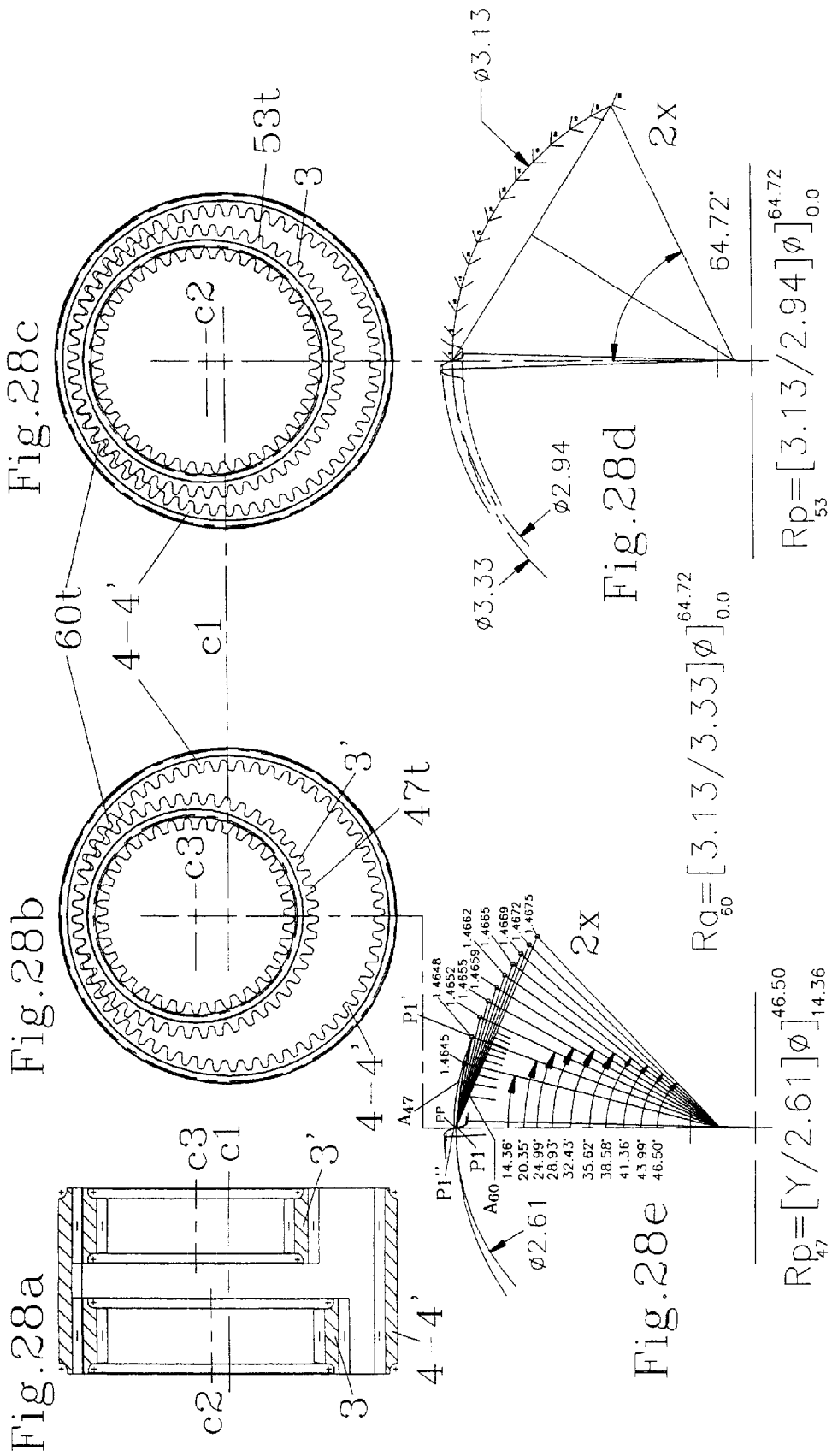

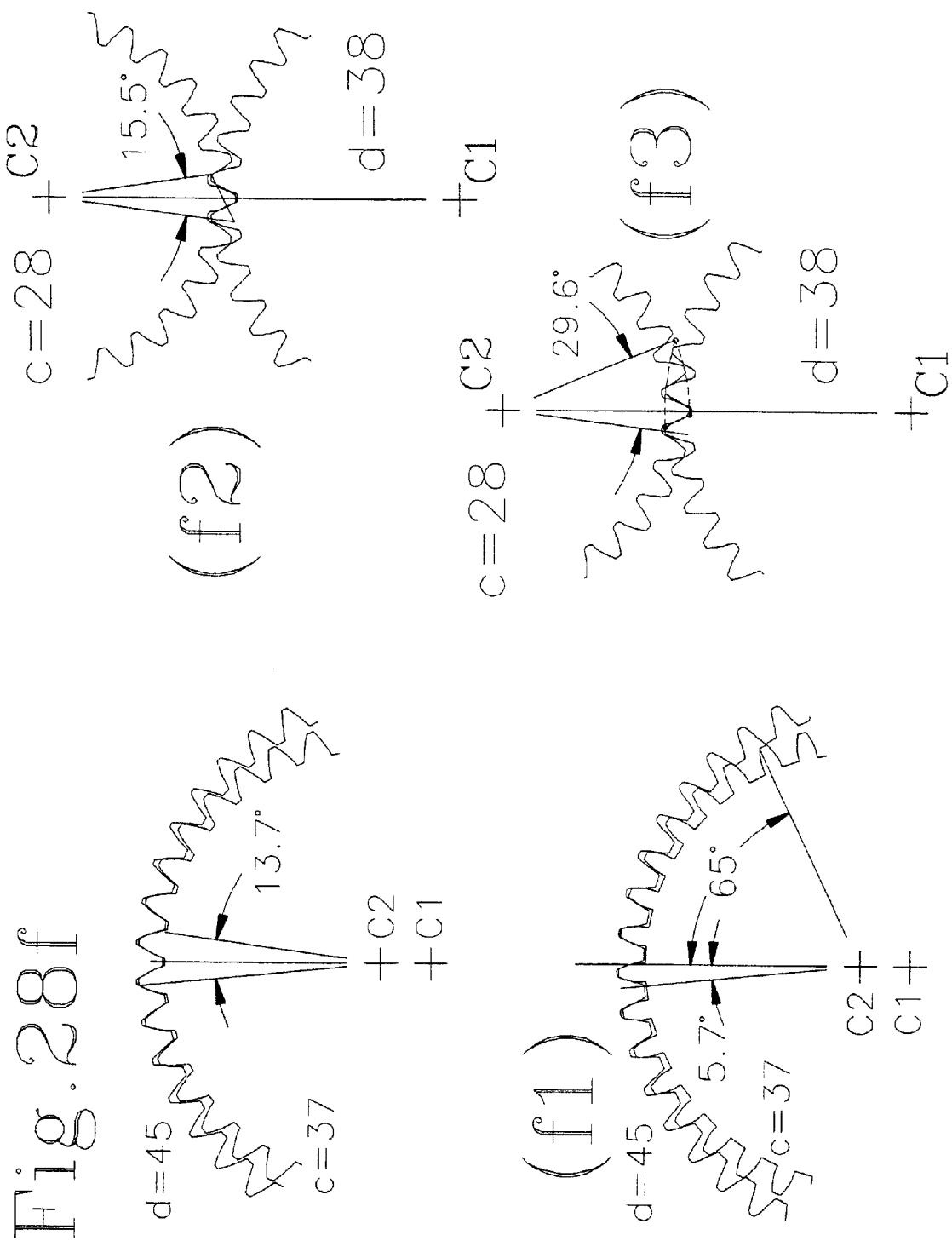

COPLANAR REVERTED GEAR TRAIN LOOP

RELATED APPLICATIONS

This application is a divisional of U.S. patent application Ser. No. 09/639,878, filed August 17, 2000, now U.S. Pat. No. 6,418,810, which is a divisional a of U.S. patent application Ser. No. 09/184,957, filed Nov. 3, 1998, now U.S. Pat. No. 6,126,566 and claims the benefit of U.S. Provisional Patent Application Serial No. 60/064,129, filed Nov. 3, 1997.

FIELD OF THE INVENTION

The present invention relates to a variable ratio gear box. In particular, the present invention relates to a variable ratio gear box employing a coplanar reverted gear train loop and a clutch assembly for changing the gear ratio of the gear box.

BACKGROUND OF THE INVENTION

Conventional variable ratio gear boxes typically include an input shaft, an output shaft, a pinion gear coupled to each shaft, and a cage assembly disposed around the input and output shafts. The cage assembly comprises at least one pair of cluster gears coupled to the pinion gears and mounted on a shaft adjacent to and parallel to the input and output shafts. A clutch assembly selectively couples the cage assembly to the gear box housing to provide a first gear ratio, or to the input or output shaft to provide a second gear ratio. The conventional variable ratio gear box may include a series of cascaded cage assemblies for providing a plurality of gear ratios.

The conventional variable ratio gear box has been widely used in manual incrementally-variable transmissions. However, the manufacture and assembly of such transmissions has been troublesome due, in part, to the difficulty of aligning the teeth of each gear element of the cluster gears to each other. Further, radial alignment errors of the cluster gear elements or their mounting shaft can cause uneven load sharing. Additionally, the cluster gears and pinions are generally manufactured with helical teeth to increase the contact ratio between the cluster gears and opinions. However, the use of helical teeth produces point contact between congruent teeth flanks, thereby subjecting teeth bearing surfaces to high contact stresses.

Attempts have been made to overcome the deficiencies of the conventional variable ratio gear box. For example, Roeder (U.S. Pat. No. 2,005,167) teaches an incrementally-variable transmission comprising coaxial input and output shafts, and a coplanar reverted gear train loop coupled to the input and output shaft through a rotating clutch. The coplanar reverted gear train loop comprises a toothed section disposed around the input shaft, a first ring gear disposed around the toothed section, a second ring gear disposed around the first ring gear, and an eccentric mounting ring for maintaining the first ring gear eccentric to the toothed section. The second ring gear is coupled to the output shaft and is coaxial to the toothed section. The rotating clutch is coupled between the input shaft and the mounting ring. When the clutch engages the mounting ring, the mounting ring rotates with the input shaft, thereby providing a first gear ratio of unity. When the clutch is disengaged from the mounting ring, a pair of toothed rings secured to the transmission housing hold the mounting ring against rotation, thereby providing a second gear ratio. Since the transmission does not require multiple gears to be mounted on a common shaft, the design reduces the alignment problems associated with the conventional variable-ratio gear box.

Gear changes are effected by providing the inner end of the input shaft with a series of axially extending teeth for slidably engaging with a similarly toothed hub carried on the input shaft. The hub is coupled to ratchet-toothed cylinder which engages a similarly-toothed cylinder coupled to the driving means. The rotating clutch is provided with actuation arms which engage a cam formed on the input shaft. With little or no load applied to the output shaft, the clutch engages the mounting ring to thereby produce the first gear ratio. However, when the load on the transmission increases, the ratchet teeth force the input shaft to be axially displaced. As a result, the cam applies pressure to the actuation arm, thereby disengaging the clutch from the mounting ring and producing the second gear ratio.

The transmission taught by Roeder includes a series of cascaded coplanar reverted gear train clutch assemblies for providing a plurality of gear ratios. However, as gear changes are affected by axial displacement of the respective input shafts, the transmission is only capable of producing gear ratios in which either all of the coplanar gear loops rotate with their respective input shaft, or one of the coplanar gear loops rotates with its respective input shaft and the mounting rings of all the preceding coplanar gear loops are held against rotation. Therefore, the total number of gear ratios available is limited. Furthermore, manufacturing and assembly costs are unnecessarily increased since the transmission requires both a rotating clutch, and toothed rings secured to the transmission housing. Accordingly, there remains a need for a variable ratio gear box which reduces the alignment problems associated with the prior art without limiting the number of gear ratios available and without unnecessarily increasing manufacturing and assembly costs.

Attempts have also been made to produce gear elements having an increased contact ratio between congruent teeth flanks. For example, Rennerfelt (U.S. Pat. No. 5,030,184) teaches an eccentric gear comprising a fixed spur gear having internal teeth, an eccentric cam secured to the input shaft of the eccentric gear, and an eccentric gear wheel rotatably coupled to the eccentric cam and having teeth engaging the internal teeth of the fixed spur gear. The teeth of the eccentric gear wheel and the teeth of the fixed spur gear are corrected by profile shifting to prevent collisions between the teeth and by stubbing to prevent collisions between the lands. The patentee states that the described profile shifting and stubbing increases the number of teeth in mesh. However, the patentee also acknowledges that, in theory, only one tooth in each loading direction will simultaneously be in mesh and that, in practice, one can achieve a greater number of teeth in mesh only by relying on the resilient nature of the teeth. However, such a practice can only increase the stress on each tooth. Accordingly, there remains a need for gear box having gears manufactured with teeth shaped to increase the contact ratio between congruent teeth flanks so as to reduce contact stress on the teeth bearing surfaces.

SUMMARY OF THE INVENTION

It is an object of the present invention to provide a variable ratio gear box having reduced sensitivity to gear alignment and having a greater number of available gear ratios in comparison with prior art gear boxes. It is also an object of the present invention to provide a variable ratio gear box having gears manufactured with teeth shaped to have an increased contact ratio between congruent teeth flanks.

In accordance with these objects, in a first embodiment of the invention there is provided a variable-ratio gear assembly comprising torque input means, torque output means, at least two intercoupled independently-variable coplanar reverted gear train loops coupled to the torque input means and the torque output means, and a clutch for varying a velocity ratio of the coplanar reverted gear train loops. Each coplanar reverted gear train loop comprises a torque input member, a torque output member and a reactive member. The clutch is coupled to the coplanar reverted gear train loops for independently switching at least two of the members from coupling to one of a rotational reference, the torque input means and the torque output means to coupling to another of the rotational reference, the torque input means and the torque output means.

In a second embodiment of the invention, there is provided a variable-ratio gear assembly comprising a coplanar reverted gear train loop including a primary torque input member, a primary torque output member, a primary torque reactive member, and an auxiliary torque member; and a clutch for varying a velocity ratio of the gear loop. The auxiliary torque member is one of a secondary torque input member, a secondary torque output member and a secondary reactive member. The clutch is coupled to the gear loop for switching the primary reactive member between coupling to one of a rotational reference, the primary torque input member and the primary torque output member to coupling to another of the rotational reference, the primary torque input member and the primary torque output member.

In one implementation of the second embodiment, the coplanar reverted gear train loop comprises a pinion gear, a pair of independent annular gears disposed around the pinion gear and being coaxial thereto, and a cluster gear member comprising a ring gear having an inner surface engaging the pinion gear and a pair of outer surfaces each engaging a respective one of the annular gears. In another implementation, the coplanar gear set comprises a pair of independent pinion gears, an annular gear disposed around the pinion gears and being coaxial thereto, and a cluster gear member comprising a ring gear having a pair of inner surfaces each engaging a respective one of the pinion gears and an outer surface engaging the annular gear.

In a third embodiment of the invention, there is provided a variable-ratio gear assembly comprising torque input means, torque output means, at least two independently-variable coplanar reverted gear train loops, and a clutch for varying a velocity ratio of the gear loops. A first of the coplanar reverted gear train loops comprises a first torque input member, a first torque output member and a first reactive member, while a second of the coplanar reverted gear train loops comprises a second torque input member, a second torque output member and a second reactive member. The first torque input member is coupled to the torque input means, the first torque output member is coupled to the torque output means, and the first reactive member is coupled to the second torque input member. The clutch is coupled to the second coplanar reverted gear train loop for selectively switching at least one of the second reactive member and the second torque output member from coupling to one of a rotational reference, the torque input means and the torque output means to coupling to another of the rotational reference, the torque input means and the torque output means.

In one implementation of the third embodiment, the clutch comprises first clutch means coupled to the second reactive member for switching the second reactive member from coupling to one of the rotational reference and the torque input means to another of the rotational reference and the torque input means, and second clutch means coupled to the second output member for switching the second reactive member from coupling to one of the rotational reference and the torque output means to another of the rotational reference and the torque output means.

In another implementation, the clutch comprises first clutch means coupled to the second reactive member and second clutch means coupled to the second output member for switching each said second reactive member and said second output member from coupling to one of the rotational reference and the torque input means to coupling to another of the rotational reference and the torque input means.

In yet another implementation, the clutch comprises first clutch means coupled to the second reactive member for coupling the second reactive member to any of the rotational reference, the torque input means and the torque output means, and second clutch means coupled to the second output member for switching the second output member from coupling to one of the rotational reference and the torque input means to coupling to another of the rotational reference and the torque input means.

For improved contact between gear teeth, each coplanar gear assembly in each embodiment preferably comprises an external gear including a first set of teeth and a first addendum circle; and an internal gear coplanar with the external gear and including a second set of teeth meshing with the first teeth set. The shape of an addendum flank of each first tooth and the shape of an addendum flank of each corresponding second tooth are defined by a curve of congruency passing between the addendum circles and extending between a point of intersection of the addendum circles and a pitch point of the gears.

Furthermore, to reduce manufacturing and assembly costs and to simplify operation of the gear assembly, the clutch in each embodiment comprises a binary clutch including a pair of clutch members, each clutch member including a set of concentric grooves disposed in a respective inner face thereof, one of the clutch members being adapted for coupling to one of the torque input means and the torque output means, and another of the clutch members being adapted for coupling to the other of the torque input means and the torque output means. An interactive member is disposed between the clutch members. The interactive member includes a pair of opposite surfaces and is adapted for coupling to a reactive member. A first of the surfaces includes a plurality of concentric grooves for meshing with one of the groove sets, and a second of the surfaces includes a plurality of concentric grooves for meshing with another of the groove sets. A clutch actuator is coupled to the interactive member for moving the interactive member between a first position engaging a first of the clutch members and a second position engaging a second of the clutch members.

BRIEF DESCRIPTION OF THE DRAWINGS

The various embodiments of the invention will now be described, by way of example only, with reference to the drawings, in which:

FIGS. 2 and 3 are exploded views of the variable-ratio gear assembly shown in FIG. 1;

FIGS. 5a–5f are schematic views of the six kinematic orders of utility of the coplanar reverted gear train loop;

FIGS. 6b–6c are cross-sectional views of the coplanar reverted gear train loop used in the gear assembly shown in FIG. 6a;

FIG. 7a is an exploded view of the band clutch used with the coplanar reverted gear train loop shown in FIGS. 6b–6c;

FIG. 7b is an exploded view of the coplanar reverted gear train loop shown in FIGS. 6b–6c;

FIG. 8b is an exploded view of the coplanar reverted gear train loop used in the gear assembly shown in FIG. 8a;

FIG. 9a is an axial cross-section view of a second embodiment of the invention, using multiple annular gears in the coplanar reverted gear train loop;

FIG. 9b is an exploded view of the coplanar reverted gear train loop shown in FIG. 9a;

FIG. 10b is an exploded view of the coplanar reverted gear train loop shown in FIG. 10a;

FIGS. 12.1:1–12.1:6, 12.2:1–12.2:6, 12.3:1–12.3:6, 12.4:1–12.4:6, and 12.5:1–112.5:6 are schematic views of 36 kinematic orders of utility of the quad-ratio coplanar reverted gear train loop shown in FIG. 11;

FIGS. 13.2, 13.4, 13.5 and 13.6 are schematic views of 12 kinematic orders of utility of a variation of the quad-ratio coplanar reverted gear train loop shown in FIG. 11;

FIGS. 14.2, 14.4, 14.5 and 14.6 are schematic views of 12 kinematic orders of utility of a five-ratio coplanar reverted gear train loop, incorporating features of the quad-ratio stages shown in FIGS. 12 and 13;

FIG. 15 is a schematic view of a two-coplanar reverted gear train loop structure according to the invention, capable of providing one reverse and two forward ratio-states;

FIG. 17a is an axial cross-section view of a differential according to the invention;

FIG. 17b is an exploded view of the differential shown in FIG. 17a;

FIG. 18b is an exploded view of the limited-action differential shown in FIG. 18a;

FIGS. 24a–24c are diagrams illustrating another method of generating addendum flank gear teeth;

FIGS. 27a–27f are diagrams illustrating a layout of a sixteen-speed, speed increasing bicycle wheel-hub transmission with on-the-go shift capability; and FIGS. 28a–28f are diagrams illustrating a method of generating addendum flank gear teeth for a double pinion/annulus gear set.

DETAILED DESCRIPTION OF THE PREFERRED EMBODIMENTS

Figure 1:
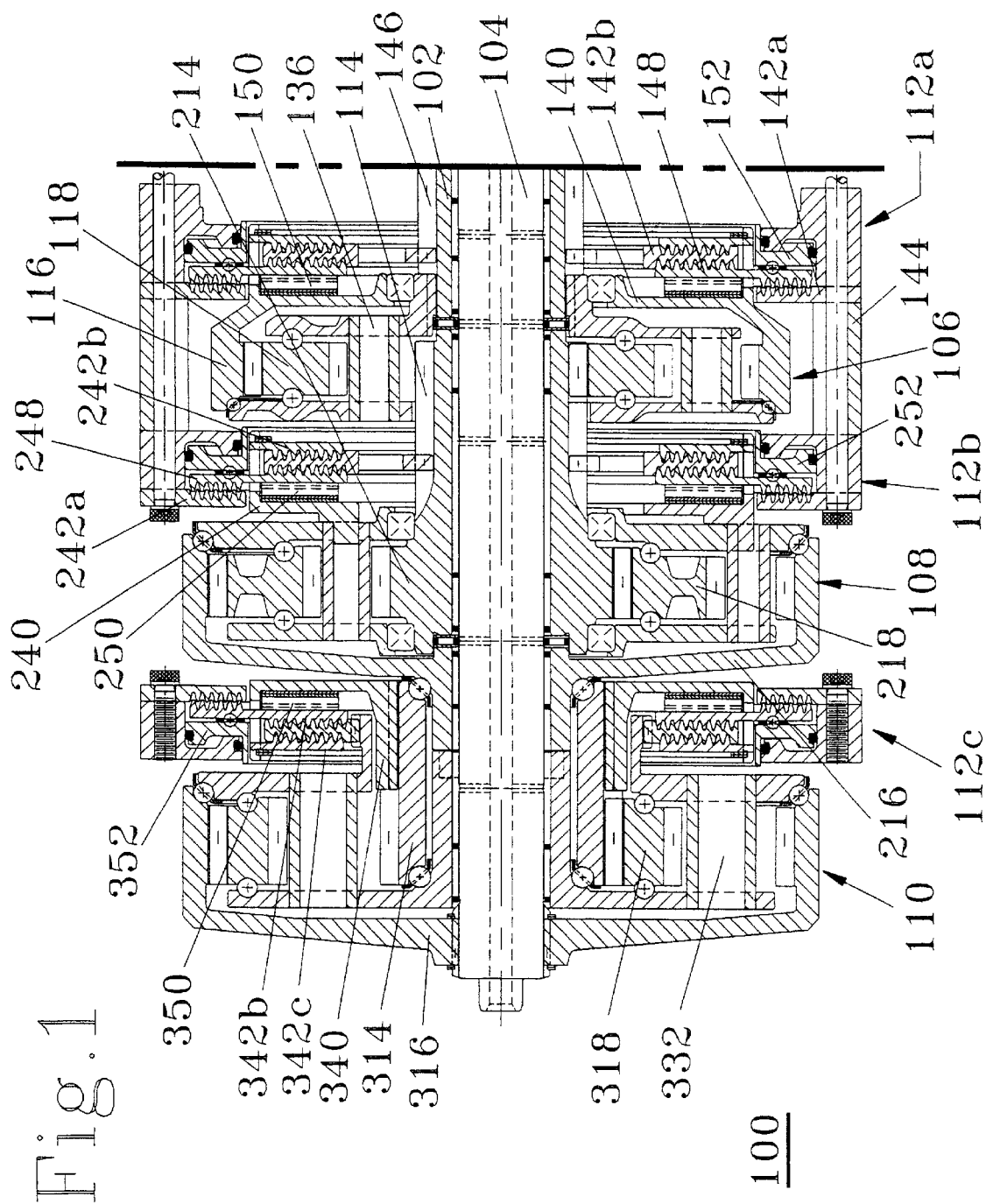
FIG. 1 is an axial cross-sectional view of the variable-ratio gear assembly according to a first embodiment of the invention.

Turning to FIG. 1, a variable-ratio gear box 100, in accordance with the invention, is shown comprising a rotating input shaft 102, a rotating output shaft 104 coaxial with the input shaft 102, a first coplanar reverted gear train loop 106 connected to the input shaft 102, a second coplanar reverted gear train loop 108 connected to the output of the first coplanar reverted gear train loop 106, and a third coplanar reverted gear train loop 110 connected to between the output of the second coplanar reverted gear train loop 108 and the output shaft 104. The variable-ratio gear box 100 also includes a clutch 112, shown individually as binary clutches 112a, 112b, 112c, coupled to each of the first coplanar reverted gear train loop 106, the second coplanar reverted gear train loop 108, and the third coplanar reverted gear train loop 110 for varying the direction and speed of rotation of the output shaft 104. As will be explained, each clutch 112a, 112b, 112c is independently operable for changing the velocity ratios of the first, second and third coplanar reverted gear train loops 106, 108, 110 independently of each other and independently of the direction of rotation of the output shaft 104. As a consequence, the invention offers improved flexibility and a greater number of gear ratios in comparison to the prior art.

Turning to FIG. 2, the first coplanar reverted gear train loop 106 is shown comprising an externally-toothed pinion gear 114 splined to the input shaft 102, an internally-toothed annular gear 116 disposed around the pinion gear 114 and coaxial to the pinion gear 114, and a cluster gear member engaging the pinion gear 114 and the annular gear 116. The cluster gear member comprises a ring gear 118, and a cage (described below) for disposing the ring gear 118 coplanar to the pinion gear 114 and the annular gear 116. The ring gear 118 has a toothed inner surface 120 for engaging the toothed outer surface 122 of the pinion gear 114, and a toothed outer surface 124 for engaging the toothed inner surface 126 of the annular gear 116. However, it should be understood that the invention is not limited to toothed gear elements, but includes coplanar reverted gear train loops having non-toothed gear wheels.

The cage comprises a first disc-shaped cage member 128a secured to the input shaft 102, a second disc-shaped cage member 128b parallel to the first cage member 128a, a pair of hollow crescent-shaped members 130, 132 extending axially between the disc-shaped cage members 128a, 128b, and bearings 134a, 134b provided on opposite end faces of the ring gear 118 for allowing the ring gear 118 to rotate between the first and second cage members 128a, 128b. The first and second cage members 128a, 128b extend transversely to the axis of the input shaft 102 and include crescent-shaped channels 136a, 138a, and crescent-shaped channels 136b, 138b respectively formed therein for receiving the ends of the crescent-shaped members 130, 132. The first and second cage members 128a, 128b and the crescent-shaped members 130, 132 are welded together and rotate with the input shaft 102 as a solid unit. The crescent-shaped member 130 is disposed between the toothed outer surface 122 of the pinion gear 114 and the inner toothed surface 120 of the ring gear 118, whereas the crescent-shaped member 132 is disposed between the toothed inner surface 126 of the annular gear 116 and the toothed outer surface 124 of the ring gear 118. The crescent-shaped members 130, 132 are radially displaced a distance from the axis of the input shaft 102 for providing the ring gear 118 with an axis of rotation eccentric to the axis of the input shaft 102.

The first coplanar reverted gear train loop 106 also includes a binary clutch 112a coupled to the transverse face 140 of the annular gear 116. The binary clutch 112a is substantially similar to the binary clutch 112b coupled to the second coplanar reverted gear train loop 108 and the binary clutch 112c coupled to the second coplanar reverted gear train loop 110, and will be more fully described below with reference to the second and third coplanar reverted gear train loops 108, 110. However, to aid in understanding the operation of the first coplanar reverted gear train loop 106, a brief description of the binary clutch 112a will now be given.

Turning again to FIG. 1, the binary clutch 112a is shown comprising a first disc-shaped clutch member 142a secured against rotation to the casing 144 of the gear box 100, a second disc-shaped clutch member 142b splined to the external teeth 146 of the input shaft 102, a disc-shaped interactive clutch member 148 secured to the transverse face 140 of the annular gear 116 through a wave spring 150. The first and second clutch member 142a, 142b each include a set of concentric grooves formed in a respective inner face thereof. The interactive clutch member 148 is disposed between the first and second clutch members 142a, 142b and includes a first set of concentric grooves formed on one face thereof for meshing with the concentric grooves formed on the first clutch member 142a, and a second set of concentric grooves formed on the opposite face for meshing with the concentric grooves formed on the second clutch member 142b. The interactive member 148 is coupled to a clutch actuator 152 which operates with the wave spring 150 for axially displacing the interactive member 148 between a first position coupling the annular gear 116 to the first clutch member 142a and a second position coupling the annular gear 116 to the second clutch member 142b.

In operation, with the actuator 152 active, the interactive member 148 is forced against the first clutch member 142a, thereby securing the annular gear 116 to the casing 144 against rotation. When the input shaft 102 rotates, the cage and the ring gear 118 are forced to rotate in the same direction as the input shaft 102, causing the pinion gear 114 to rotate with a first velocity ratio (described below) in a direction opposite to the direction of rotation of the input shaft 102. However, when the actuator 152 is inactive, the wave spring 150 forces the interactive member 148 against the second clutch member 142b, thereby coupling the annular gear 116 to the input shaft 102. As a result, when the input shaft 102 rotates, the annular gear 116, the cage and the ring gear 118 rotate as a single unit, causing the pinion gear 114 to rotate in the same direction and with the same speed of rotation as the input shaft 102. Therefore, it will be appreciated that in the first coplanar reverted gear train loop 106, the cage acts as a torque input member, the annular gear 116 acts as a reactive member, and the pinion gear 114 acts as a torque output member which changes direction of rotation depending upon the axial position of the interactive member 148.

The second coplanar reverted gear train loop 108 will now be described with reference to FIGS. 1 and 2. As shown therein, the second coplanar reverted gear train loop 108 comprises pinion gear 214 formed as part of and coaxial to the pinion gear 114, an internally-toothed annular gear 216 disposed around the pinion gear 214 and coaxial to the pinion gear 214, and a cluster gear member engaging the pinion gear 214 and the annular gear 216. The cluster gear member comprises a ring gear 218, and a cage for disposing the ring gear 218 coplanar to the pinion gear 214 and the annular gear 216. The ring gear 218 has a toothed inner surface 220 for engaging the toothed outer surface 222 of the pinion gear 214, and a toothed outer surface 224 for engaging the toothed inner surface 226 of the annular gear 216.

The cage comprises a first disc-shaped cage member 228a, a second disc-shaped cage member 228b parallel to the first cage member 228a, a pair of hollow crescent-shaped members 230, 232 extending axially between the disc-shaped cage members 228a, 228b, and bearings 234a, 234b provided on opposite end faces of the ring gear 218 for allowing the ring gear 218 to rotate between the first and second cage members 228a, 228b. The first and second cage members 228a, 228b extend transversely to the axis of the input shaft 102 and include crescent-shaped channels 236a, 238a, and crescent-shaped channels 236b, 238b respectively formed therein for receiving the ends of the crescent-shaped members 230, 232. The first and second cage members 228a, 228b and the crescent-shaped members 230, 232 are welded together and rotate as a solid unit. The crescent-shaped member 230 is disposed between the toothed outer surface 222 of the pinion gear 214 and the toothed inner surface 220 of the ring gear 218, whereas the crescent-shaped member 232 is disposed between the toothed inner surface 226 of the annular gear 216 and the toothed outer surface 224 of the ring gear 218. The crescent-shaped members 230, 232 are radially displaced a distance from the axis of the input shaft 102 for providing the ring gear 218 with an axis of rotation eccentric to the axis of the input shaft 102.

Figure 3:
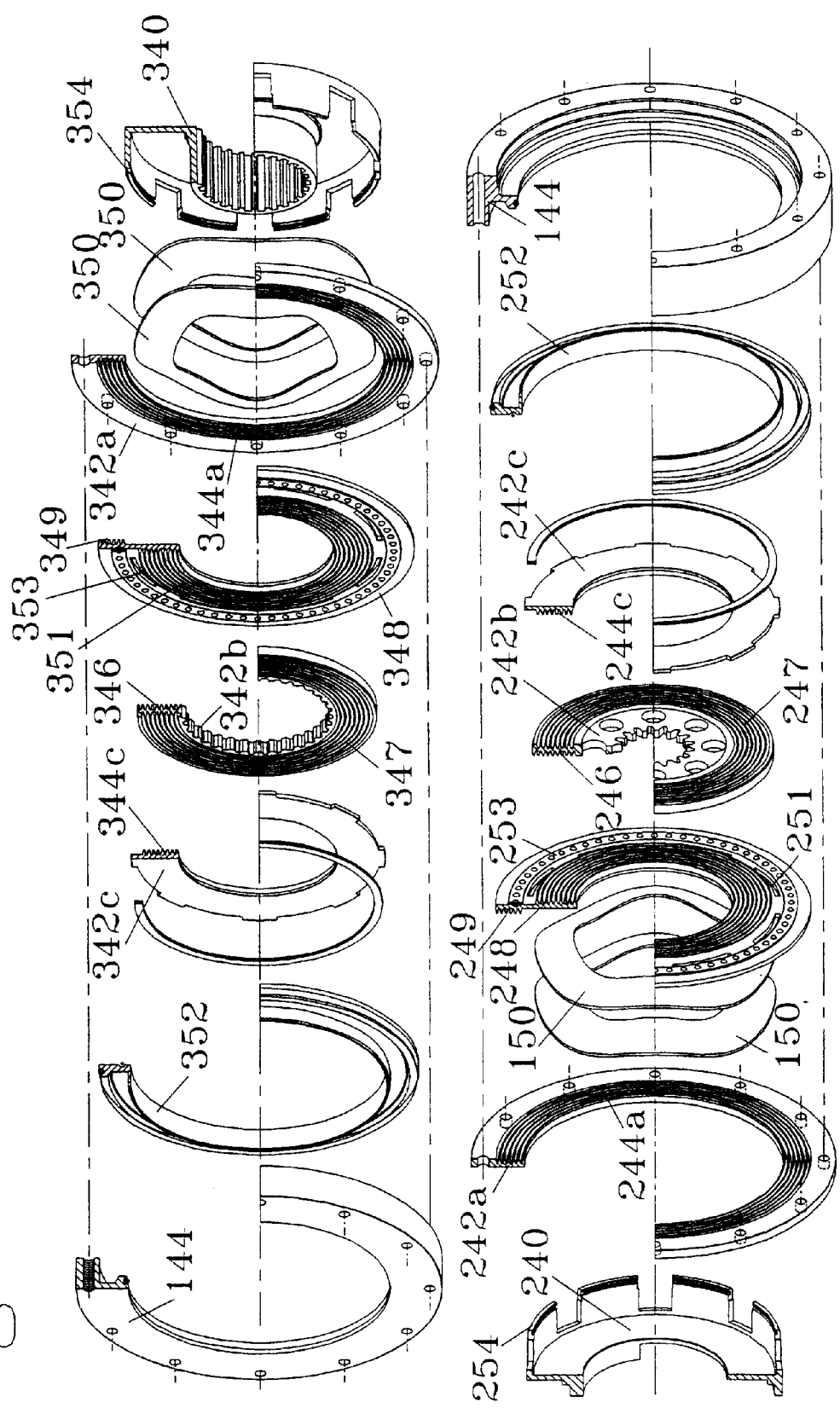

The second coplanar reverted gear train loop 108 also includes a novel binary clutch 112b coupled to the first cage member 228a. Turning to FIG. 3, the binary clutch 112b is shown comprising a clutch housing 240 secured to the first cage member 228a, a first disc-shaped clutch member 242a secured against rotation to the casing 144 of the gear box 100, a second disc-shaped clutch member 242b splined to the external teeth 122 of the pinion 114, a third disc-shaped clutch member 242c provided adjacent the outer surface of the second disc-shaped clutch member 242b and having tabs for securing the third clutch member 242c to the clutch housing 240, and a disc-shaped interactive clutch member 248 disposed between the first and second clutch members 242a, 242b, and wave springs 250 disposed between the clutch housing 240 and the interactive clutch member 248.

The first clutch member 242a includes a set of concentric V-grooves 244a formed in an inner face thereof. Similarly, the third clutch member 242c includes a set of concentric V-grooves 244c formed in an inner face thereof. The second clutch member 242b includes a first set of concentric V-grooves 246 formed in a inner face thereof, and a second set of concentric V-grooves 247 formed in a outer face thereof which mesh with the concentric V-grooves 244c formed on the third clutch member 242c. The interactive clutch member 248 includes a plurality of slots 253 which engage similarly shaped tabs 254 formed on the clutch housing 240 for rotating the clutch housing 240 together with the interactive member 248. The interactive member 248 also includes a first set of concentric V-grooves 249 formed on one face thereof which mesh with the concentric V-grooves 244a formed on the first clutch member 242a, and a second set of concentric V-grooves 251 formed on the opposite face for meshing with the concentric V-grooves 246 formed on the second clutch member 242b. The outer radial margin of the interactive member 248 is coupled to a clutch actuator 252 which operates with the wave spring 250 for axially displacing the interactive member 248 between a first position coupling the cage to the first clutch member 242a and a second position coupling the cage to the second and third clutch member 242b, 242c. Since the binary clutches 112a, 112b, 112c each employ V-grooves, the frictional surface area of the clutch is increased, thereby reducing the number of plates and discs required in a clutch pack. Further, since disc separation is much more positive than in conventional clutch packs, open clutch plate drag is all but eliminated.

In operation, with the actuator 252 active, the interactive member 248 is forced against the first clutch member 242a, thereby securing the clutch housing 240 and the cage to the casing 144 against rotation. When the pinion gear 114 rotates, the pinion gear 214 and the ring gear 218 rotate causing the annular gear 216 to rotate with a first velocity ratio (described below). However, when the actuator 252 is inactive, the wave spring 250 forces the interactive member 248 against the second clutch member 242b, thereby coupling the clutch housing 240 and the cage to the pinion gear 214. As a result, when the pinion gear 114 rotates, the pinion gear 214, the cage and the ring gear 218 rotate as a single unit, causing the annular gear 216 to rotate with the same speed of rotation as the pinion gear 214. Therefore, it will be appreciated that in the second coplanar reverted gear train loop 108, the pinion gear 214 acts as a torque input member, the cage acts as a reactive member, and the annular gear 216 acts as a torque output member which changes speed of rotation depending upon the axial position of the interactive member 248.

The third coplanar reverted gear train loop 110 is substantially similar to the first and second coplanar reverted gear train loop 106, 108. Again with reference to FIGS. 1 and 2, the third coplanar reverted gear train loop 110 is shown comprising a pinion gear 314 having external teeth 322, 323, an internally-toothed annular gear 316 disposed around the pinion gear 314 and splined to the output shaft 104, and a cluster gear member engaging the pinion gear 314 and the annular gear 316. The cluster gear member comprises a ring gear 318, and a cage for disposing the ring gear 318 coplanar to the pinion gear 314 and the annular gear 316. The ring gear 318 has a toothed inner surface 320 for engaging the toothed outer surface 322 of the pinion gear 314, and a toothed outer surface 324 for engaging the toothed inner surface 326 of the annular gear 316.

The cage comprises a first disc-shaped cage member 328a, a second disc-shaped cage member 328b parallel to the first cage member 328a and coupled to the annular gear 216, a pair of hollow crescent-shaped members 330, 332, and bearings 234a, 234b. The first and second cage members 228a, 228b include crescent-shaped channels 336a, 338a, and crescent-shaped channels 336b, 338b. The crescent-shaped members 3230, 332 are radially displaced a distance from the axis of the input shaft 102 for providing the ring gear 318 with an axis of rotation eccentric to the axis of the input shaft 102.

The third coplanar reverted gear train loop 110 also includes a binary clutch 112c coupled to the pinion gear 314. Turning to FIG. 3, the binary clutch 112c is shown comprising a clutch housing 340 splined to the external teeth 323 of the pinion gear 314, first and third disc-shaped clutch members 342a, 342c, second disc-shaped clutch member 342b splined to the first cage member 328a, a disc-shaped interactive clutch member 348 disposed between the first and second clutch members 342a, 342b, and wave springs 350 disposed between the clutch housing 340 and the interactive clutch member 348. The first and third clutch member 342a, 342c respectively include concentric V-grooves 344a, 344c. The second clutch member 342b includes concentric V-grooves 346, 347 formed on opposite faces thereof. Similarly, the interactive clutch member 348 includes concentric V-grooves 349, 351 formed on opposite faces thereof. The interactive clutch member 348 also includes a plurality of slots 353 which engage similarly shaped tabs 354 formed on the clutch housing 340 for rotating the clutch housing 340 together with the interactive member 348. The outer radial margin of the interactive member 348 is coupled to a clutch actuator 352 which operates with the wave springs 350 for axially displacing the interactive member 348 between a first position coupling the pinion gear 314 to the first clutch member 342a and a second position coupling the pinion gear 314 to the second and third clutch member 342b, 342c.

In operation, with the actuator 352 active, the interactive member 348 is forced against the first clutch member 342a, thereby securing the pinion gear 314 to the casing 144 against rotation. When the cage and the clutch housing 340 rotate, the ring gear 318 also rotates causing the annular gear 316 to rotate with a first velocity ratio (described below). However, when the actuator 352 is inactive, the wave spring 350 forces the interactive member 348 against the second clutch member 342b, thereby coupling the cage and the clutch housing 340 to the pinion gear 314. As a result, when the annular gear 216 rotates, the pinion gear 314, the cage and the ring gear 318 rotate as a single unit, causing the annular gear 316 and the output shaft 104 to rotate with the same speed of rotation as the annular gear 216. Therefore, it will be appreciated that in the third coplanar reverted gear train loop 110, the cage acts as a torque input member, the pinion gear 314 acts as a reactive member, and the annular gear 316 acts as a torque output member which changes speed of rotation depending upon the axial position of the interactive member 348.

Since the binary clutches 112 are all independently operable, the velocity ratio of each of the coplanar reverted gear train loops 106, 108, 110 can be changed independently of each other. Furthermore, since each coplanar reverted gear train loop 106, 108, 110 can either have a velocity ratio of unity, or a velocity ratio other than unity, depending upon the state of the respective binary clutch 112a, 112b, 112c, and since the output (pinion gear 114) of the first coplanar reverted gear train loop 106 is coupled to the input (pinion gear 214) of the second coplanar reverted gear train loop 108 and the output (annular gear 216) of the second coplanar reverted gear train loop 108 is coupled to the input (cage) of the second coplanar reverted gear train loop 110, the variable-ratio gear box 100 can have any one of eight possible gear ratios. Adding coplanar reverted gear train loops will double the number of gear ratios available for each stage added. Accordingly, it is possible to construct a gear box having $2^n$ gear ratios, where n is a positive integer including 1 and representing the number of coplanar reverted gear train loops. The attainment of such a large number of gear ratios without a significant increase in manufacturing or assembly costs is a significant advance over the conventional gear boxes.

In the embodiment shown in FIG. 1, the non-unity velocity ratio produced by the first coplanar reverted gear train loop 106 is different that the non-unity velocity ratio produced by the second and third coplanar reverted gear train loop 108, 110. This result is a consequence of applying torque to and removing torque from different elements of each coplanar reverted gear train loop. In the first coplanar reverted gear train loop 106, the torque input member 106 is the cage, the torque output member is the pinion 114, and the reactive member is the annular gear member 116. In contrast, in the second coplanar reverted gear train loop 108, the torque input member is the pinion gear 214, the torque output member is the annular gear 216, and the reactive member is the cage. In the third coplanar reverted gear train loop 110, the torque input member is the cage, the torque output member is the annular gear, and the reactive member is the pinion gear. Therefore, it will be appreciated that any of the pinion gear, annular gear, and cage may act as the torque input member and the torque output member. Accordingly, each coplanar reverted gear train loop is capable of being arranged in one of six (3!) possible kinematic orders of utility, depending upon which element is used as the torque input member and which element is used as the torque output member.

Figure 5A:
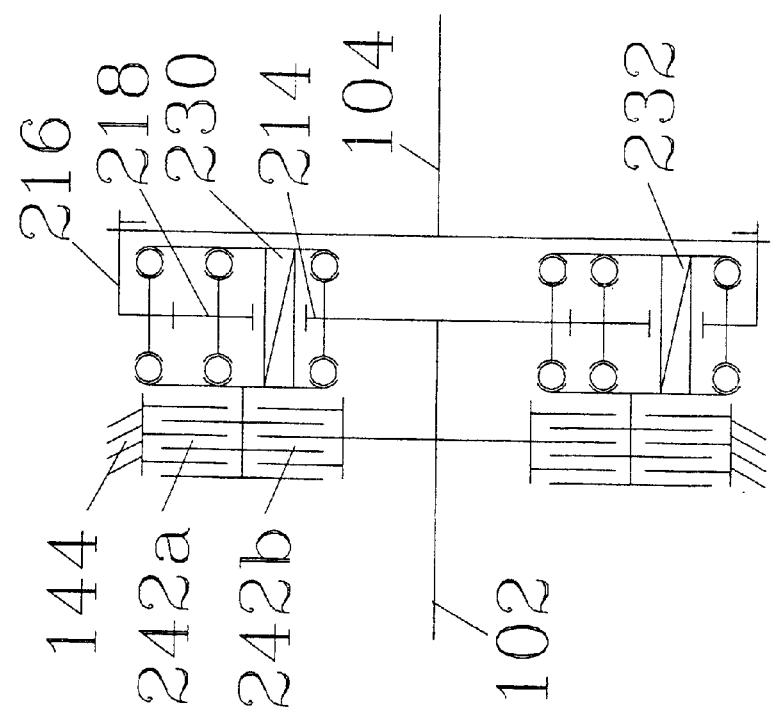
Figure 4:
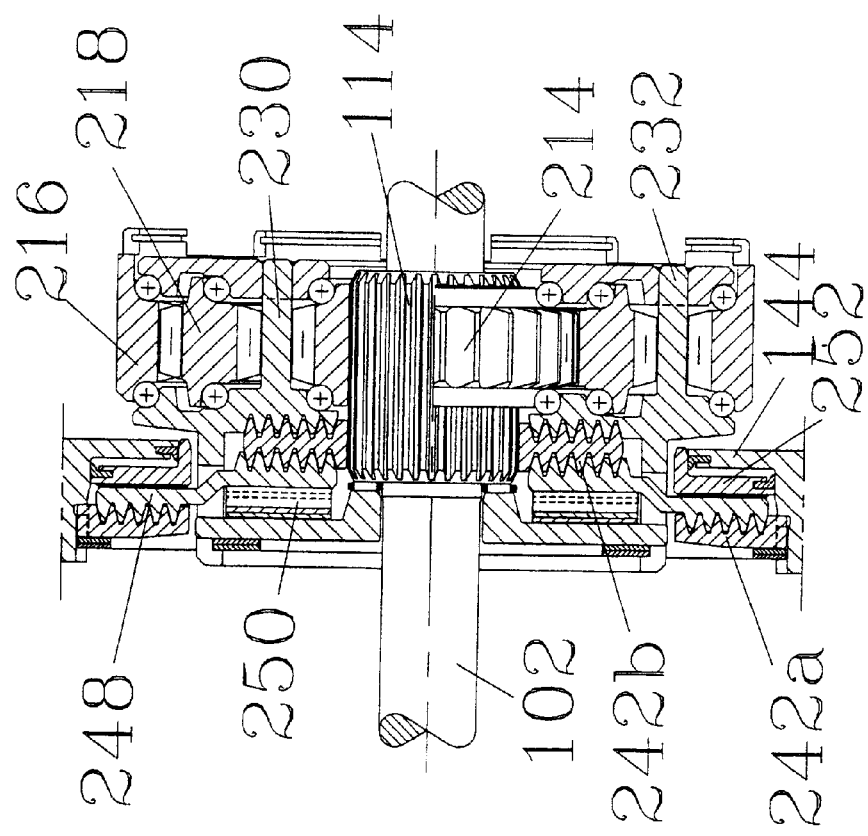
FIG. 4 is an axial cross-sectional view of one kinematic order of utility of the coplanar reverted gear train loop according to the invention.

One possible kinematic order of utility is shown in FIG. 4, together with the associated schematic diagram in FIG. 5a. The remaining five possible kinematic orders of utility are shown schematically in FIGS. 5b–5f. The reader will observe that FIG. 5a represents the second coplanar reverted gear train loop 108, FIG. 5d represents the third coplanar reverted gear train loop 110, and FIG. 5f represents the first coplanar reverted gear train loop 106. The associated non-unity velocity ratios for each kinematic order of utility (with interactive member engaging the first clutch member 242a) are as follows, with K1 representing the product (a/b)(c/d), where "a" is the number of teeth on the pinion gear 214, "b" is the number of teeth on the inner surface 220 of the ring gear 218, "c" is the number of teeth on the outer surface 224 of the ring gear 218, and "d" is the number of teeth on the annular member 216:

1) FIG. 5a, with pinion 214 affixed to input shaft 102, annulus 216 affixed to output shaft 104, and the clutch pack affixed to the cage 219, a first-order ratio is:

K1

2) FIG. 5b, with pinion 214 affixed to input shaft 102, annulus 216 affixed to the clutch pack, and cage 219 affixed to output shaft 104, a second-order ratio is:

−1/((1/K1)−1)

3) FIG. 5c, with annulus 216 affixed to input shaft 102, cage 219 affixed to the clutch pack, and pinion 214 affixed to output shaft 104, a third-order ratio is:

1/K1

4) FIG. 5d, with annulus 216 affixed to input shaft 102, pinion 214 affixed to the clutch pack, and cage 219 affixed to output shaft 104, a fourth-order ratio is:

1(1−K1)

5) FIG. 5e, with cage 219 affixed to input shaft 102, pinion 214 affixed to the clutch pack, and annulus 216 affixed to output shaft 104, a fifth-order ratio is:

1−K1

6) FIG. 5f, with cage 219 affixed to input shaft 102, annulus 216 affixed to the clutch pack, and pinion 214 affixed to output shaft 104, a sixth-order ratio is:

1−1/K1

The velocity ratio for each variation, with the interactive member engaging the second clutch member 242b, is unity.

Since the ratios a/b and c/d of a coplanar loop gear assembly can only be less than one, it follows that:
1) first-order ratios will always be less than one,
2) second-order ratios will always be greater than one, and always negative,
3) third-order ratios will always be greater than one,
4) fourth-order ratios will always be greater than one,
5) fifth-order ratios will always be less than one, and
6) sixth-order ratios will always be greater than one, and always negative.

Figure 6A:
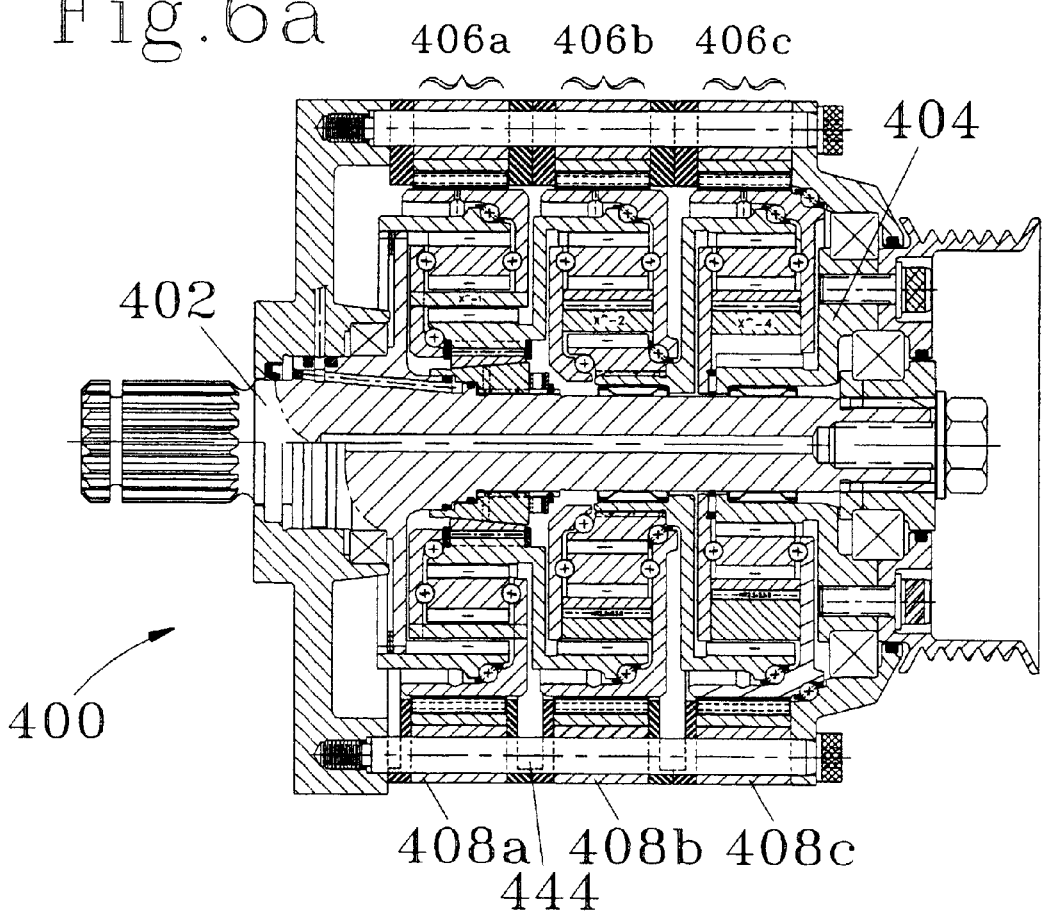
FIG. 6a is an axial cross-sectional views of a variation of the variable-ratio gear assembly shown in FIG. 1, employing a hydraulic band clutch.

FIGS. 1–3 represent one variation of a first embodiment of the invention. FIG. 6a illustrates an output-increasing 8-speed transmission 400 using a novel band clutch instead of the binary clutch 112 used in FIGS. 1–3. The transmission 400 comprises a rotating input shaft 402, a rotating output shaft 404 coaxial with the input shaft 402, first, second and third third-order coplanar reverted gear train loops 406a, 406b, 406c coupled between the input shaft 402 and the output shaft 404, and a clutch 408, comprising band clutches 408a, 408b, 408c, respectively coupled to the coplanar reverted gear train loops 406a, 406b, 406c for varying the speed of rotation of the output shaft 404.

Figure 6B:
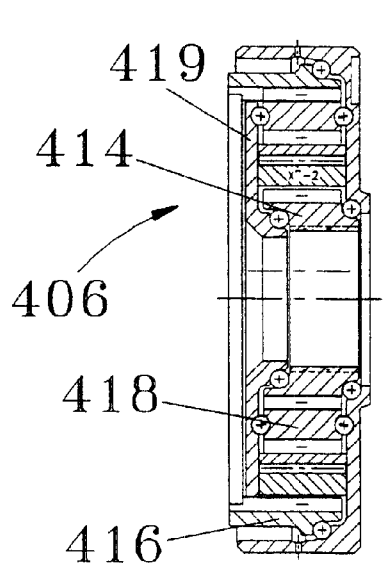
Figure 6C:
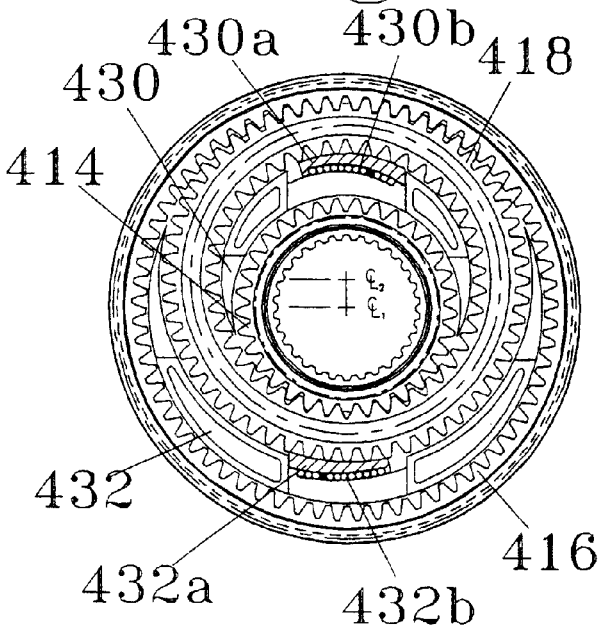

Each third-order coplanar reverted gear train loop 406 is shown in FIGS. 6b, 6c, 7b comprising an externally-toothed pinion gear 414, an internally-toothed annular gear 416 disposed around the pinion gear 414 and coaxial to the pinion gear 414, and a cluster gear member engaging the pinion gear 414 and the annular gear 416. The cluster gear member comprises a ring gear 418, and a cage 419 for providing the ring gear 418 with an axis of rotation eccentric to that of the input shaft 302. The cage 419 comprises a first drum-shaped cage member 428a, a second disc-shaped cage member 428b parallel to the first cage member 428a, and a pair of crescent-shaped members 430, 432 extending axially between the cage members 428a, 428b. Bearings (not shown) are provided on opposite end faces of the ring gear 418 for allowing the ring gear 418 to rotate between the first and second cage members 428a, 428b.

The first and second cage members 428a, 428b extend transversely to the axis of the input shaft 402 and include crescent-shaped channels, such as channels 436a, 438a, 439a, and channel 436b respectively formed therein for receiving the ends of the crescent-shaped members 430, 432. The first and second cage members 428a, 428b are welded together and rotate as a solid unit. The crescent-shaped member 430, 432 respectively include slippers 430a, 432a, and rollers 430b, 432b and comprise sectors of a spiral type one-way clutch for selectively preventing rotation between the pinion gear 414, annular gear 416 and ring gear 418 when the band clutch 408 is released.

As shown in FIG. 7a, each band clutch 408 comprises a cylindrical stator 460 secured to the transmission casing 444, a cylindrical rotor 462 positioned inside the stator 460, a band member 464 disposed between the inner surface 466 of the rotor 462 and the outer surface 468 of the cage member 428a, and end members 470a, 470b secured to opposite ends of the stator 460. The band member 464 is secured at one end 464a to the rotor 462 at slot 462a, and is secured at the other end 464b to the stator 460 through notches 472a, 472b formed in the end plates 470a, 470b. Each band clutch 408 is independently activated by injecting hydraulic fluid between the stator 460 and the outer surface 474 of the rotor 462 to impart rotation to the rotor 462 and thereby tighten the band member 464 around the outer surface 468 of the cage member 428a. In doing so, the cage 406 is secured against rotation to the casing 444, thereby providing the first velocity ratio. When the band member 464 is released, the cage 406 is free to rotate. However, since each third-order coplanar reverted gear train loop 406 is a speed increasing loop, the crescent-shaped members 430, 432 prevent relative rotation between the pinion gear 414, annular gear 416 and ring gear 418, thereby providing the second velocity ratio of unity.

Figure 8A:
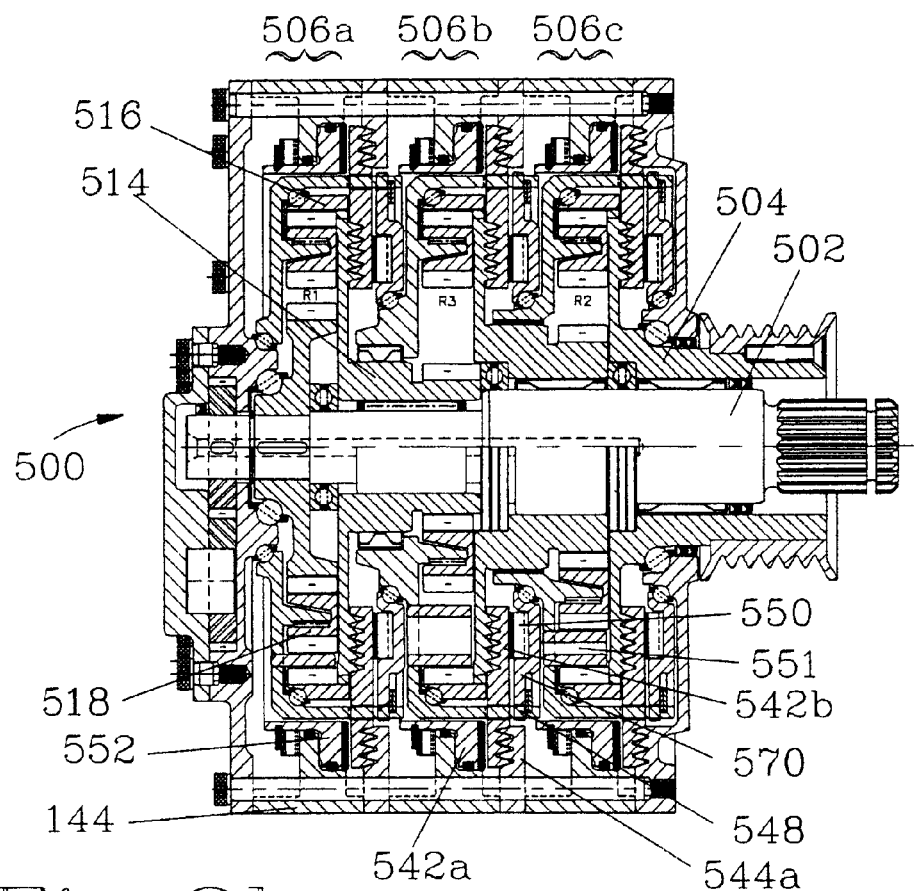
FIG. 8a is an axial cross-section view of another variation of the variable-ratio gear assembly shown in FIG. 1, using a novel binary clutch.
Figure 8B:
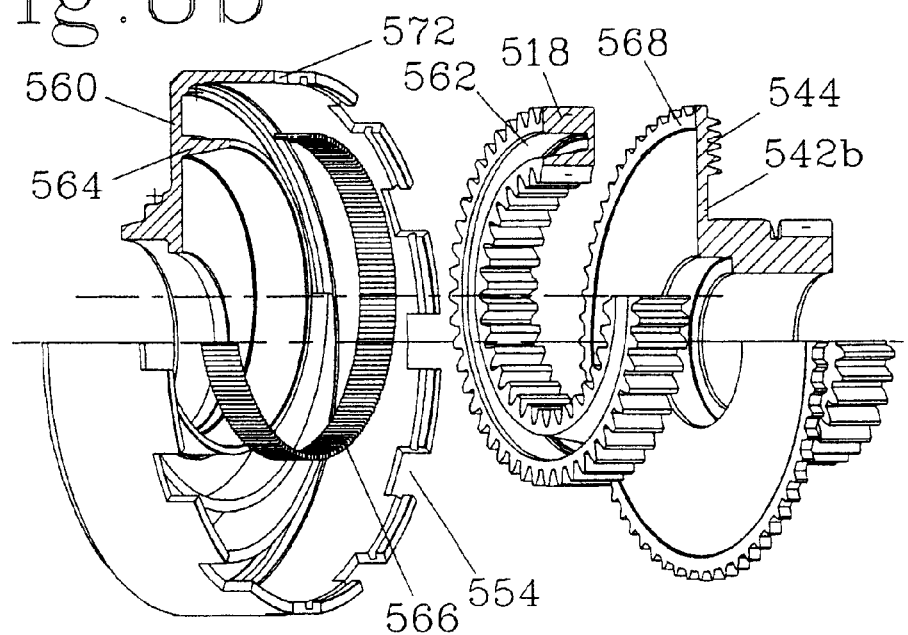

FIGS. 8a, 8b illustrate an output-decreasing 8-speed transmission 500 using a novel binary clutch requiring fewer parts than the binary clutch 112. The transmission 500 comprises a rotating input shaft 502, a rotating output shaft 504 coaxial with the input shaft 502, first, second and third first-order coplanar reverted gear train loops 506a, 506b, 506c coupled between the input shaft 502 and the output shaft 504, and a clutch, shown individually as binary clutches 508a, 508b, 508c, coupled to each of the coplanar reverted gear train loops 506a, 506b, 506c for varying the speed of rotation of the output shaft 504. As above, each clutch 508a, 508b, 508c is independently operable for independently changing the velocity ratio of the first, second and third coplanar reverted gear train loops 506a, 506b, 506c.

Each first-order coplanar reverted gear train loop 506 comprises an externally-toothed pinion gear 514, an internally-toothed annular gear 516 disposed around the pinion gear 514 and coaxial to the pinion gear 514, and a cluster gear member including a ring gear 518 and a drum-shaped cage 560 enclosing the pinion gear 514, annular gear 516 and ring gear 518. The ring gear 518 includes a race 562 formed in one side thereof, and the cage 560 includes a similar race 564 eccentric to the input shaft 502. Bearings 566 are provided between the race 562 and the race 564 for allowing the ring gear 518 to rotate within the cage 560 around an axis eccentric to the input shaft 502. The pinion gear 514 is formed with a transversely-extending disc-shaped clutch member 542b having splines 568 disposed around the circumference for engaging with the annular gear 516 of the preceding stage.

The clutch 512 comprises a disc-shaped clutch member 542a secured against rotation to the transmission casing 144, the above-described disc-shaped clutch member 542b, a disc-shaped interactive clutch member 548 disposed between the clutch members 542a, 542b, and wave springs 550 disposed between the interactive clutch member 548 and a flange 570 extending transversely inwards from the radially outermost wall 572 of the cage 560.

The clutch members 542a, 542b each include a set of concentric V-grooves 544a, 544b respectively formed in a face thereof. The interactive clutch member 548 includes a plurality of slots (not shown) which engage similarly shaped tabs 554 formed on the cage 560 for rotating the cage 560 together with the interactive member 548. The interactive member 548 also includes a first set of concentric V-grooves 549 formed on one face thereof which mesh with the concentric V-grooves 544a formed on the clutch member 542a, and a second set of concentric V-grooves 551 formed on the opposite face for meshing with the concentric V-grooves 544b formed on the clutch member 542b. The outer radial margin of the interactive member 548 is coupled to a clutch actuator 552 which operates with the wave spring 550 for axially displacing the interactive member 548 between a first position coupling the cage 560 to the clutch member 542a and a second position coupling the cage 560 to the clutch member 542b.

Operation of the binary clutch 512 is similar to that of the binary clutch 112. When the actuator 552 is active, the interactive member 548 is forced against the clutch member 542a, thereby securing the cage 560 to the casing 144 against rotation. When the actuator 552 is inactive, the wave spring 550 forces the interactive member 548 against the clutch member 542b, thereby coupling the cage 560 to the pinion gear 514.

FIGS. 9a, 9b illustrate a second embodiment of the invention, which further increases the number of available gear ratios. The coplanar reverted gear train loop 600, as shown therein, comprises a pinion gear 614, a first internally-toothed annular gear 616a disposed around the pinion gear 614 and coaxial to the pinion gear 614, a second internally-toothed annular gear 616b disposed around the pinion gear 614 and coaxial to the pinion gear 614, and a cluster gear member engaging the pinion gear 614a and the annular gears 616a, 616b. The cluster gear member comprises a Y-shaped ring gear 618, and a cage 619 for allowing the ring gear 618 to rotate around an axis eccentric to the pinion 614. The ring gear 618 has a toothed inner surface 620 for engaging the toothed outer surface 622 of the pinion gear 614, a first toothed outer surface 624a for engaging the toothed inner surface 626a of the annular gear 616a, and a second toothed outer surface 624b for engaging the toothed inner surface 626b of the annular gear 616b.

The cage 619 comprises a first disc-shaped cage member 628a, a second disc-shaped cage member 628b parallel to the first cage member 628a, a pair of crescent-shaped members 630, 632 extending axially between the disc-shaped cage members 628a, 628b, and bearings 634a, 634b provided on opposite end faces of the ring gear 618 for allowing the ring gear 618 to rotate between the first and second cage members 628a, 628b. The first and second cage members 628a, 628b extend transversely to the axis of the pinion gear 614 and include crescent-shaped channels 636a, 638a, and crescent-shaped channels 636b, 638b respectively formed therein for receiving the ends of the crescent-shaped members 630, 632. The first and second cage members 628a, 628b and the crescent-shaped members 630, 632 are welded together and rotate as a solid unit.

As will be appreciated, the coplanar reverted gear train loop 600 effectively has a torque input member, a torque output member, a reactive member, and an auxiliary member capable of acting as a further torque input member or a torque output member. Accordingly, the coplanar reverted gear train loop 600 is capable of providing 24 (4!) kinematic orders of utility. If all four gears are used simultaneously, a further 24 kinematic orders of utility is possible, for a total of 48 kinematic orders of utility.

Figure 10A:
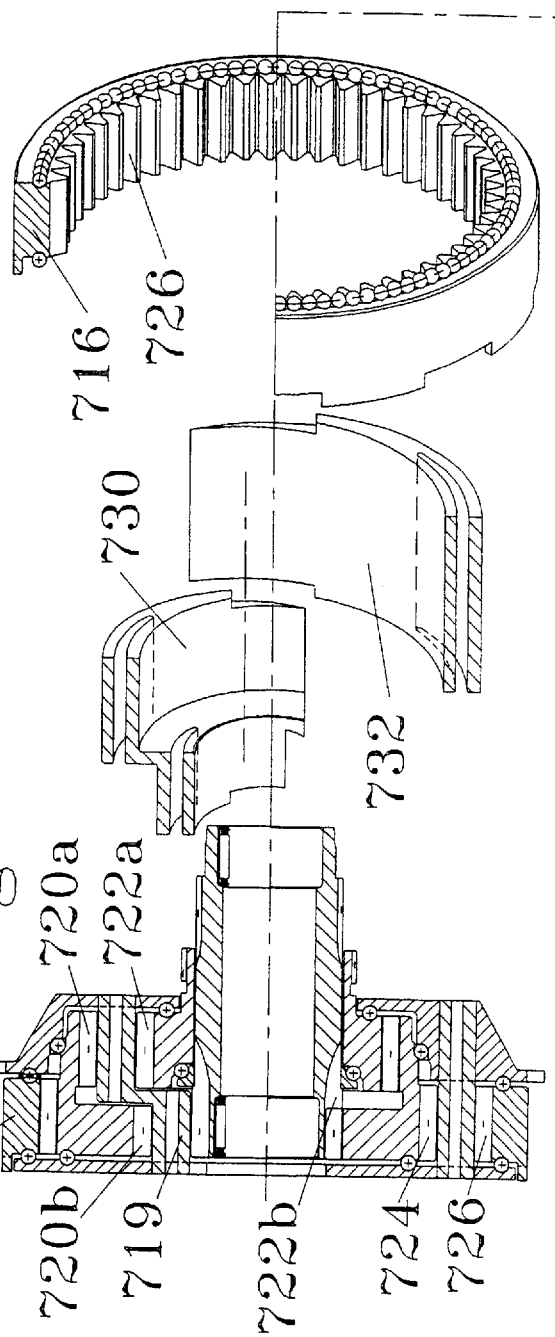
FIG. 10a is an axial cross-section view of a second embodiment of the invention, using multiple pinion gears in the coplanar reverted gear train loop.
Figure 10B:
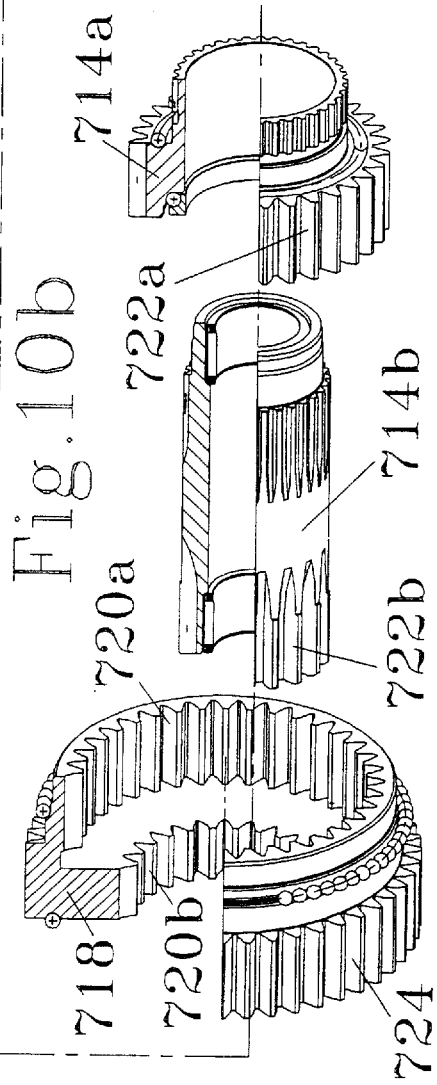

FIGS. 10a, 10b illustrate a coplanar reverted gear train loop 700, similar to the coplanar reverted gear train loop 600, but comprising a first pinion gear 714a, a second pinion gear 714b, an internally-toothed annular gear 716 disposed around the pinion gears 714a, 714b and coaxial to the pinion gears 714a, 714b, and a cluster gear member engaging the pinion gears 714a, 714b and the annular gear 716. The cluster gear member comprises an inverted Y-shaped ring gear 718, and a cage 719 including crescent-shaped members 730, 732 for allowing the ring gear 718 to rotate around an axis eccentric to the pinion gears 714a, 714b. The ring gear 718 has a first toothed inner surface 720a for engaging the first toothed outer surface 722a of the first pinion gear 714a, a second toothed inner surface 720b for engaging the second toothed outer surface 722b of the second pinion gear 714b, and a toothed outer surface 724 for engaging the toothed inner surface 726 of the annular gear 716. As above, the coplanar reverted gear train loop 700 is capable of providing 24 (4!) kinematic orders of utility. If all four gears are used simultaneously, a further 24 kinematic orders of utility is possible, for a total of 48 kinematic orders of utility.

As discussed above with reference to FIG. 1, each coplanar reverted gear train loop is capable of being arranged in one of six possible kinematic orders of utility, depending upon which element is used as the torque input member and which element is used as the torque output member. Accordingly, for a four-speed transmission employing two series-coupled coplanar reverted gear train loops, a total of 36 kinematic orders of utility are possible. However, thus far each embodiment illustrating more than one coplanar reverted gear train loop has shown the torque output member of one coplanar reverted gear train loop coupled to the torque input member of the following coplanar reverted gear train loop. Further kinematic orders of utility are possible by adopting alternate structures, such as the structure shown in FIG. 11.

Figure 11:
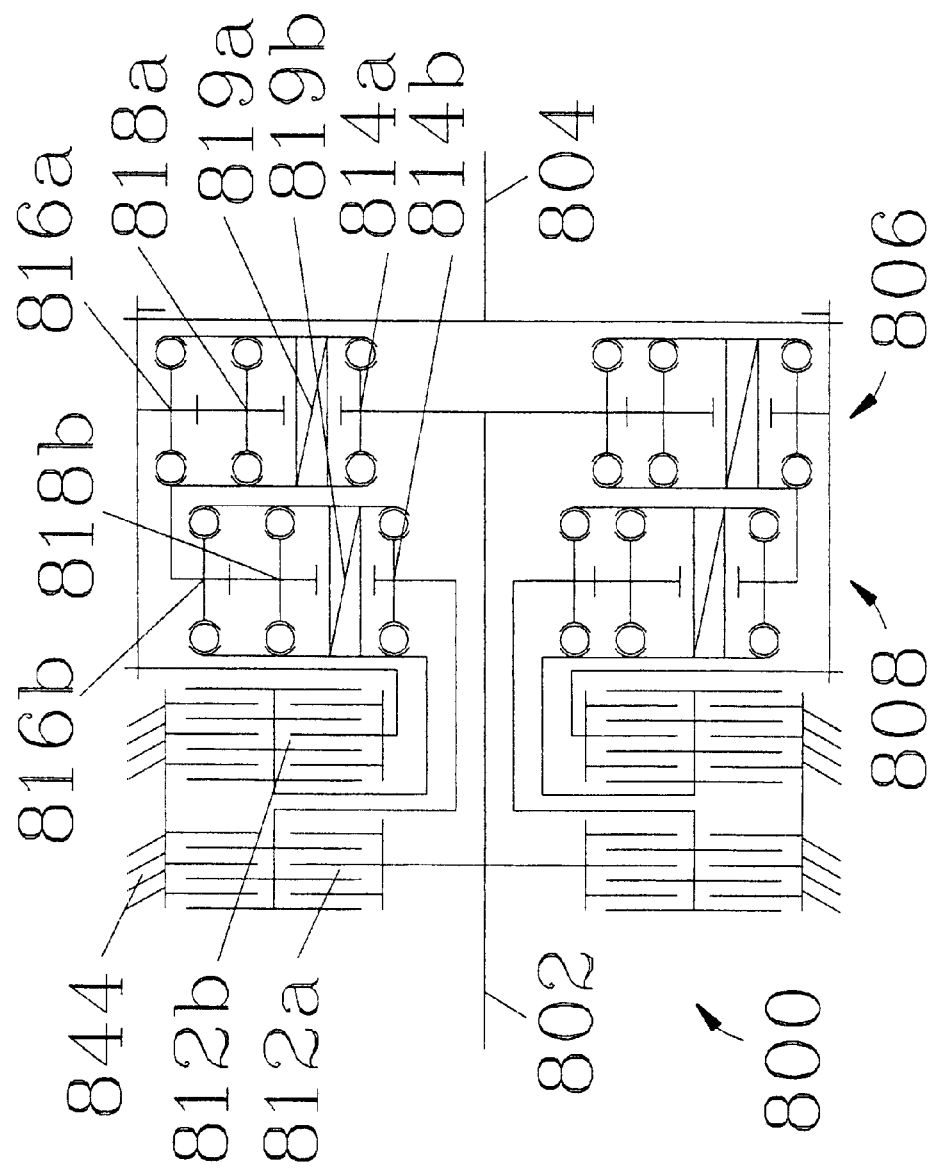
FIG. 11 is a schematic view of one kinematic order of utility of a quad-ratio coplanar reverted gear train loop, according to a third embodiment of the invention.

The gear assembly 800, shown schematically in FIG. 11, is a quad-ratio stage comprising a rotating input shaft 802, a rotating output shaft 804 coaxial to the input shaft 802, and intercoupled first and second coplanar reverted gear train loops 806, 808 coupled to the input shaft 802 and the output shaft 804. The first coplanar reverted gear train loop 806 comprises an externally-toothed pinion gear 814a coupled to the input shaft 802, an internally-toothed annular gear 816a coupled to the output shaft 804, and a cluster gear member engaging the pinion gear 814a and the annular gear 816a. The cluster gear member comprises a ring gear 818a, and a cage 819a for providing the ring gear 818a with an axis of rotation eccentric to the axis of the input shaft 802. Since the first coplanar reverted gear train loop 806 is coupled to the input shaft, it will be referred to as the "power stage" hereafter.

The second coplanar reverted gear train loop 808 is a reactive stage and comprises an externally-toothed pinion gear 814b coupled to the first binary clutch 812a, an internally-toothed annular gear 816b coupled to the cage 819a of the first coplanar reverted gear train loop 806, and a cluster gear member engaging the pinion gear 814b and the annular gear 816b. The cluster gear member comprises a ring gear 818b, and a cage 819b for providing the ring gear 818b with an axis of rotation eccentric to the axis of the input shaft 802. The cage 819b is coupled to the second binary clutch 812b for switching the cage 819b between coupling to the casing 844 and coupling to the output shaft 804. The first binary clutch 812a operates independently of the second binary clutch 812b and switches the pinion gear 814b between coupling to the casing 844 and coupling to the input shaft 802. Since the second coplanar reverted gear train loop 808 is coupled to the reactive member of the power stage, it will be referred to as the "reactive stage" hereafter.

The four velocity ratios of the coplanar reverted gear train loop 800, are as follows, with the power stage ratio K1 representing the product (a/b)(c/d), where "a" is the number of teeth on the pinion gear 814a, "b" is the number of teeth on the inner surface of the ring gear 818a, "c" is the number of teeth on the outer surface of the ring gear 818a, and "d" is the number of teeth on the annular member 816a, and with the reactive stage ratio K2 representing the product (a'/b') (c'/d'), where "a'" is the number of teeth on the pinion gear 814b, "b'" is the number of teeth on the inner surface of the ring gear 818b, "c'" is the number of teeth on the outer surface of the ring gear 818b, and "d'" is the number of teeth on the annular member 816b:

1) When the pinion gear 814b and the cage 819b are both coupled to the casing 844, the annular gear 816b and the cage 819a are stationary, resulting in first-order ratio-state:

$$1st\ \text{ratio-state} = 1/K1,$$

2) When pinion gear 814b is coupled to the input shaft 802 and the cage 819b is coupled to the casing 844, annular gear 816b and cage 819a will rotate, resulting in second-order ratio-state:

$$2nd\ \text{ratio-state} = 1+[(1-1/K1)(1-K2)]$$

3) When pinion gear 814b is coupled to the casing 844 and the cage 819b coupled to output shaft 804, annular gear 816b and cage 819a will rotate, resulting in a third-order ratio state:

$$3rd\ \text{ratio-state} = 1/[(1-K1)((K2))]$$

4 When pinion gear 814b is coupled to the input shaft 802 and the cage 819b coupled to the output shaft 804, all components of the gear assembly 800 will act as a solid coupling, resulting in fourth-order ratio state of unity.

It will be appreciated that, pursuant to the discussion of FIG. 5, since each coplanar reverted gear train loop is capable of being arranged in one of six possible kinematic orders of utility, the gear assembly 800 is only one of 36 possible kinematic orders of utility. FIGS. 12.1:1 to 12.6:6 are schematic layouts of all thirty-six kinematic orders of the integrated four-speed structure 800, and the following table lists the first-order, second-order and third-order ratios for each order. The identifier of the form "X:Y" associated with each figure and each table entry represents the kinematic order of the integrated four-speed structure, with "X" representing the kinematic order of the power stage and "Y" representing the kinematic order of the reactive stage.

In each case, the 4th order ratio-state is unity when both clutches couple their associated reactive members to the input 802 and the output shaft 804.

FIG. 13 are schematic layouts of 12 preferred kinematic orders of a quad-ratio stage similar to the schematics layouts of FIG. 12 except that the two reactive members of the reactive stage are either both coupled to the input shaft 802, to the output shaft 804, or to the casing 844. The following table lists the first-order, second-order and third-order ratios for each preferred order. The identifier of the form "X:Y.Z" associated with each figure and each table entry represents the kinematic order of the integrated four-speed structure, with "X" representing the kinematic order of the power stage, "Y" representing the kinematic order of the reactive stage, and "Z" representing coupling to the input shaft 802 (I) or to the output shaft 804 (O).

In each case, the 4th order ratio-state is unity when both clutches couple their associated reactive members to the input 802 or to the output shaft 804.

FIG. 14 are schematic layouts of 12 preferred kinematic orders of a five-ratio stage which includes features of the quad-ratio stage of FIG. 12 and the quad-ratio stage of FIG. 13, allowing one of the reactive members of the reactive stage to be coupled to any of the casing 844, the input shaft 802 and the output shaft 804. The following table lists the first-order, second-order and third-order ratios for each preferred order. The identifier of the form "X:Y" associated with each figure and each table entry represents the kinematic order of the integrated five-speed structure, with "X" representing the kinematic order of the power stage, "Y" representing the kinematic order of the reactive stage.

In each case, the 5th order ratio-state is unity when both clutches couple their associated reactive members to the input shaft 802 or to the output shaft 804.

Thus far in the description of the embodiments of the invention, the highest order ratio-state has always been unity. FIG. 15 illustrates a two coplanar reverted gear train loop structure, without this requirement, and capable of providing a reverse and two forward ratio-states. The coplanar reverted gear train loop structure 900, shown in FIG. 15, comprises a rotating input shaft 902, a rotating output shaft 904 coaxial to the input shaft 902, and intercoupled first and second coplanar reverted gear train loops 906, 908 coupled to the input shaft 902 and the output shaft 904. The first coplanar gear train loop 906 comprises pinion gear 914$a$ coupled to the input shaft 902, annular gear 916$a$ disposed around the pinion gear 914$a$, and cage 919$a$ coupled to the output shaft 904. The second coplanar gear train loop 908 comprises pinion gear 914$b$ coupled to the annular gear 916$a$, cage 919$b$ grounded to the casing 914, and annular gear 916$b$ affixed to a clutch pack for coupling the annular gear 916$b$ to any of the casing 944, the input shaft 902, or the cage 919$a$.

With the ratios of the first and second coplanar loops 906, 908 respectively k1 and k2, the output/input ratio-states of the structure 900 are:

1) $1-1/k1$, a first order mechanism when the annular gear 916$b$ is coupled to the casing 944;
2) $(1-1/k1)+(-1/(1/k2)-1)$, a sum of first and third order mechanisms when the annular gear 916 is coupled to the cage 919$a$; and
3) $1/(1+(1/k2)(1/k1))$, a mutated first/sixth order mechanism when the annular gear 916$b$ is coupled to the input shaft 902.

Figure 16:
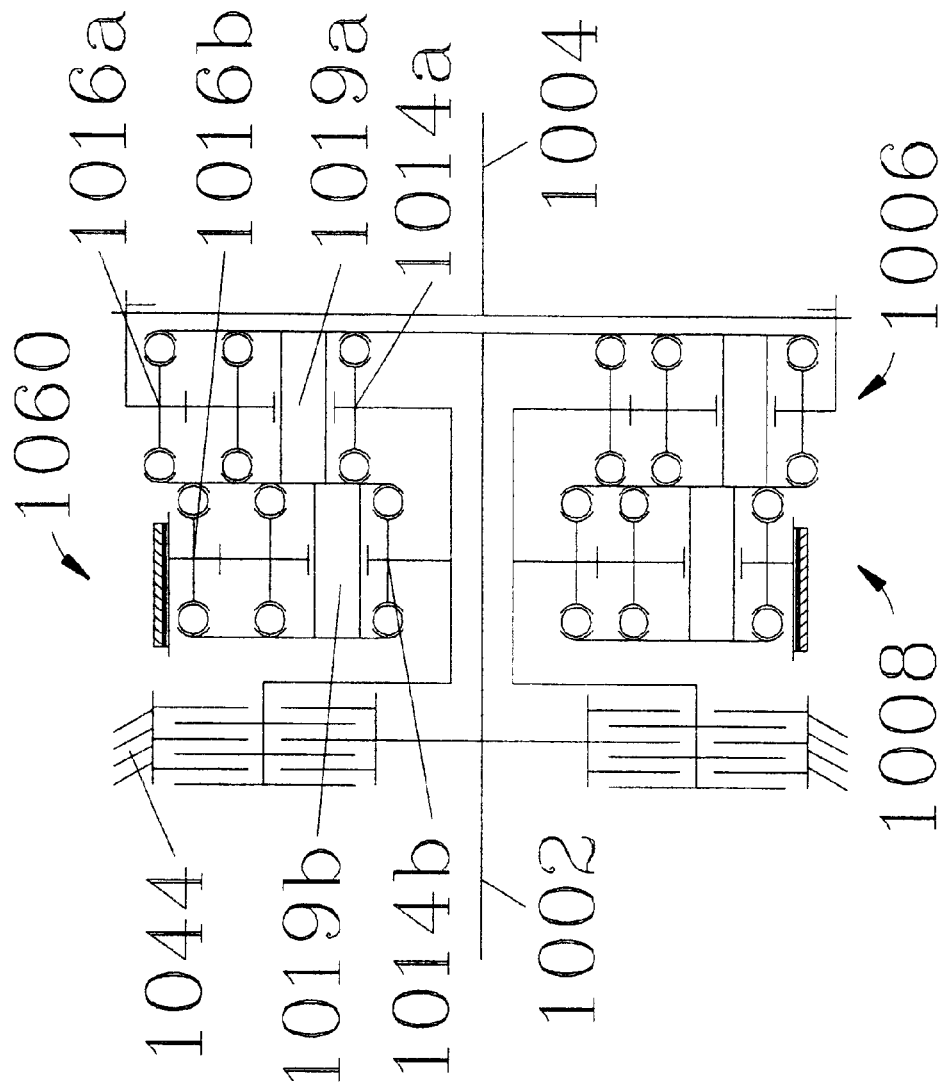
FIG. 16 is a schematic view of a two-coplanar reverted gear train loop structure according to the invention, capable of providing either three forward ratio-states, or one reverse and two forward ratio-states.

FIG. 16 illustrates a two coplanar reverted gear train loop structure capable of providing either three forward ratio-states, or two forward and one reverse ratio-states. The coplanar reverted gear train loop structure 1000, shown in FIG. 16, comprises a rotating input shaft 1002, a rotating output shaft 1004, and intercoupled first and second coplanar reverted gear train loops 1006, 1008 coupled to the input shaft 1002 and the output shaft 1004. The first coplanar gear train loop 1006 comprises a pinion gear 1014$a$, a cage 1019$a$ coupled to the input shaft 1002, and an annular gear 1016$a$ coupled to the output shaft 1004. The second coplanar gear train loop 1008 comprises a cage 1019$b$ coupled to the cage 1019$a$, an annular gear 1016$b$ coupled to the casing 1044 through a band clutch 1060, and a pinion gear 1014$b$ coupled to the pinion gear 1014$a$ and to a clutch pack for coupling the pinion gears 1014$a$, 1014$b$ to any of the casing 1044, or the input shaft 1002.

With the ratios of the coplanar loops 1006, 1008 respectively k1 and k2, the output/input ratio-states of the structure 1000 are:

1) $1-1/k1$, a first order mechanism when the pinions 1014 are coupled to the casing 1044;
2) $1-(k1/k2)$, a mutated first/third order mechanisms when the band clutch 1060 is activated, coupling the annular gear 1016$b$ to the casing 1044; and
3) 1, when the pinions 1014 are coupled to the input shaft 1002.

While ratio-state 1) can only be positive, ratio-state 2) can be either positive or negative depending on the relative values of the variables k1 and k2. When k1 is greater than k2, ratio-state 2) is negative, and when k1 is less than k2 ratio-state 2) is positive.

Turning now to FIG. 17, a differential 1100 according to the invention is shown comprising a left axle 1102, a right axle 1104, and a single coplanar reverted gear train loop 1106 coupled to the left axle 1102 and the right axle 1104. The coplanar reverted gear train loop 1106 comprises an externally-toothed pinion gear 1114 integrally formed with the left axle 1102, an internally-toothed annular gear 1116 coupled to a power input source through tabs 1116$a$ integrally formed with the annular gear 1116, and a cluster gear member engaging the pinion gear 1114 and the annular gear 1116. The cluster gear member comprises a ring gear 1118, and a cage for providing the ring gear 1118 with an axis of rotation eccentric to the axles 1102, 1104. The cage comprises a first disc-shaped cage member 1128$a$ secured to the right axle 1104, a second disc-shaped cage member 1128$b$ parallel to the first cage member 1128$a$, and a pair of crescent-shaped members 1130, 1132 extending axially between the disc-shaped cage members 1128$a$, 1128$b$ When the differential 1100 is installed in a motor vehicle, and the vehicle is moving in a straight line, the left and right axles 1102, 1104 will be moving at the same rotational speed, causing the pinion gear 1114, annular gear 1116 and cage to rotate as a solid coupling. However, if the vehicle turns and one of the axles 1102, 1104 is forced to rotate at a faster speed than the other, the increased speed of rotation of the faster rotating axle will reduce the speed of rotation of the other axle. If K1=2, any increase or decrease in speed of one axle will produce a corresponding decrease or increase in speed of the other axle.

Figure 18A:
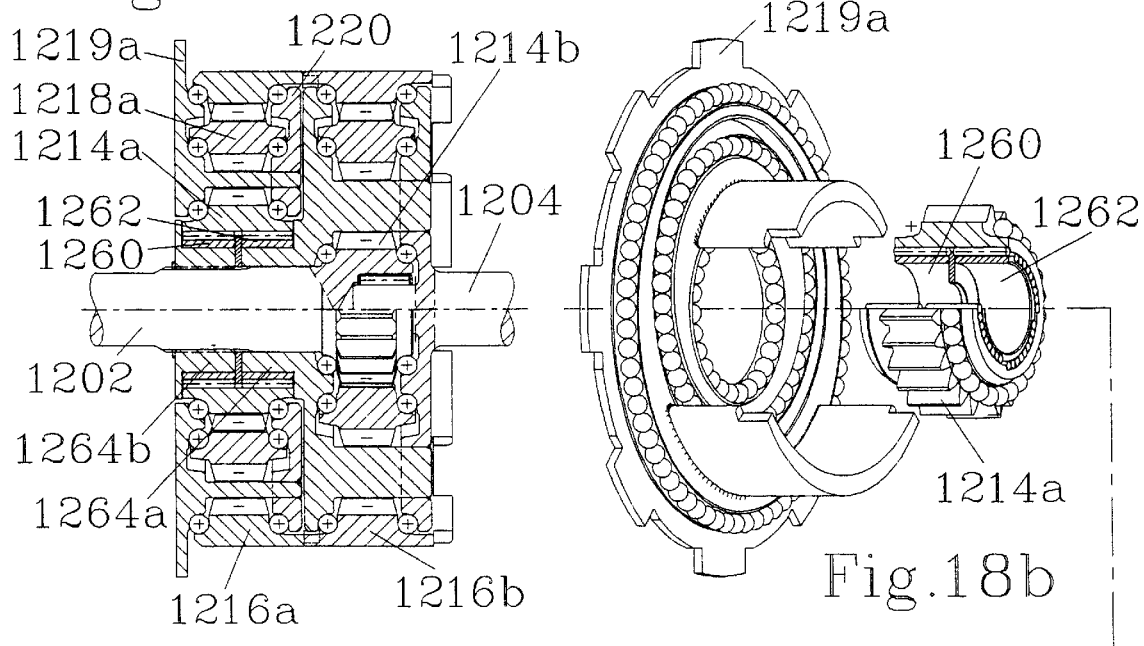
FIG. 18a is an axial cross-section view of a limited-action differential according to the invention.
Figure 18B:
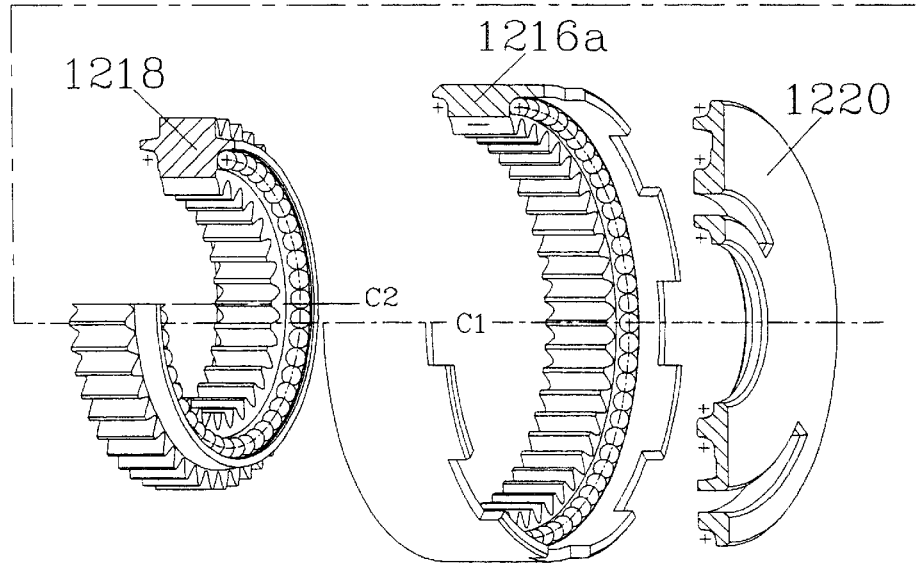

FIG. 18 illustrates a differential, similar to the differential 1100, but being a limited-action differential. The limited action differential 1200 comprises a left axle 1202, a right axle 1204, and a pair of intercoupled first and second coplanar reverted gear train loops 1206, 1208 coupled to the left axle 1202 and the right axle 1204. The first coplanar reverted gear train loop 1206 comprises an externally-toothed pinion gear 1214$a$ surrounding the left axle 1202, a first spiral type one-way clutch 1260 provided between the pinion gear 1214$a$ and the left axle 1202 and splined to the left axle 1202, a second spiral type one-way clutch 1262 provided between the pinion gear 1214$a$ and the left axle 1202, an internally-toothed annular gear 1216$a$, a ring gear 1218$a$ engaging the pinion gear 1214$a$ and the annular gear 1216$a$, and a cage 1219 secured to the differential casing through tabs 1219$a$.

The second coplanar reverted gear train loop 1208 comprises a pinion gear 1214$b$ formed on the right axle 1204, an annular gear 1216$b$ coupled to the annular gear 1216$a$ and a power source, a ring gear 1218$a$ engaging the pinion gear 1214$b$ and the annular gear 1216$b$, and a cage having an extension 1262 provided between the left axle 1202 and the second clutch 1262 and acting as an overrunning race therefor.

With like rotation of the left and right axles 1202, 1204, pinion 1214$a$ will rotate freely because of the orientation of the incorporated double one-way clutches 1260, 1262. However, during vehicle turning manoeuvres, or when differential wheel slip takes place, and with a ratio-state of 1/k1=1.20 for the first coplanar loop 1206, a difference in rotational speeds between the two axles 1202, 1204 is limited to 20% by coupling which takes place when either of the one-way clutches 1260, 1262 is forced into congruency with the race members attached to the axles 1202, 1204.

Figure 19A:
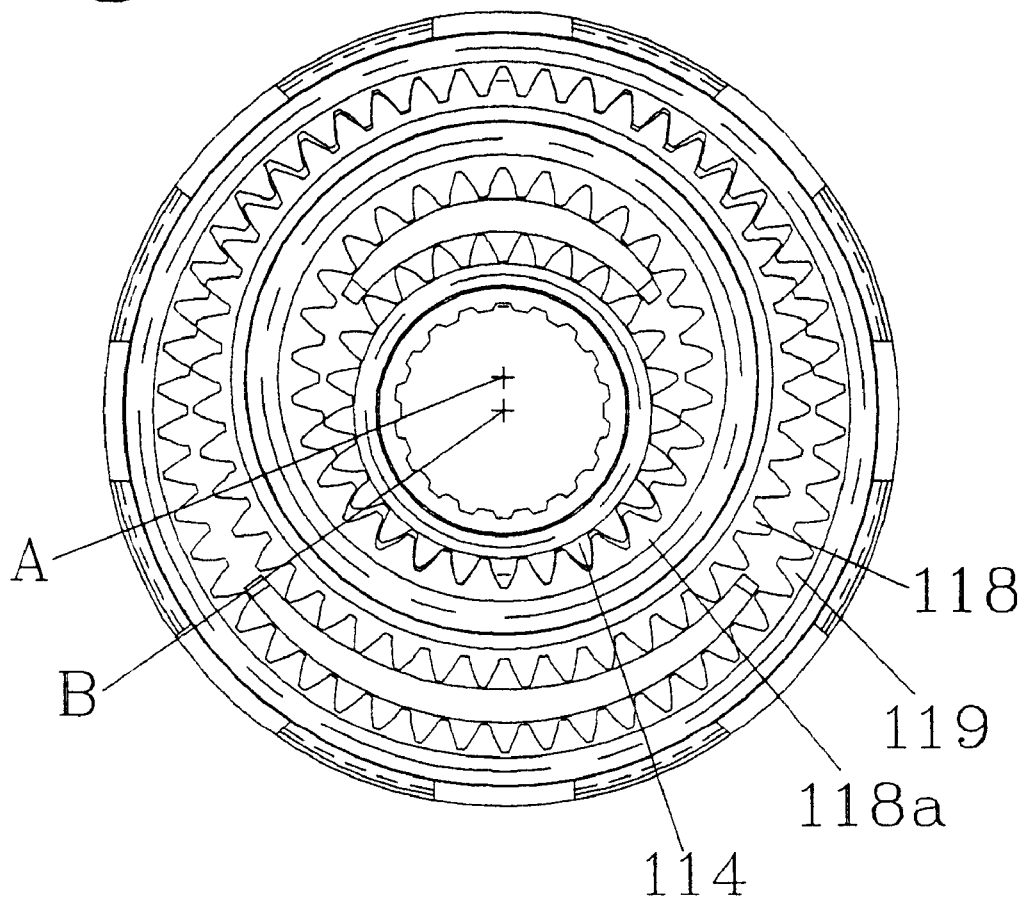
FIGS. 19a, 19b are cross-sectional views of a coplanar reverted gear train loop having conventional involute form gear teeth.

Turning to FIGS. 19$a$ and 19$b$, a method of improving the contact ratio of the coplanar gear assemblies of the present invention will now be discussed. FIG. 19$a$ shows the annular gear 116 and the ring gear 118 of the coplanar reverted gear train loop in contact at the pitch point. The ring gear 118 has centre A and the annular gear 116 has centre B. The externally-toothed ring gear 118 has 37 involute generated teeth, and the internally-toothed annular gear 116 has 45 involute generated teeth, resulting in an arc of congruency of 13.7° with a 25° pressure angle.

A general expression of contact ratio is:

$$Tc=(1+T)(Aa/360)$$

where Tc is tooth contact ratio, T is half the number of teeth on both gear elements and Aa is the arc of congruency of the gear-set. Accordingly, the contact ratio of the involute-toothed gear-set shown in FIG. 19 is only:

$$Tc=(1+41)(13.7/360)=1.60$$

To increase the contact ratio between gear elements and thereby reduce the contact stress on the teeth bearing surfaces, the applicant has invented a novel addendum-form tooth flank which produces sliding contact between contacting teeth without loss of efficiency. These novel addendum form teeth are in stark contrast to conventional involute form teeth which impinge and roll with minimal sliding contact.

FIG. 20 illustrates one method of generating the addendum form teeth according to the invention. Although the following method is illustrated using internal/external gears 116, 118, it should be understood that the method is applicable to any pinion and gear set. Furthermore, although the method shown in FIG. 20 involves the use of a simple arc of congruency, it should also be understood that the addendum form teeth according to the invention can be generated using any curve extending between the addendum circles of the gear set, from the addendum circle contact point to the pitch point.

Figure 20A:
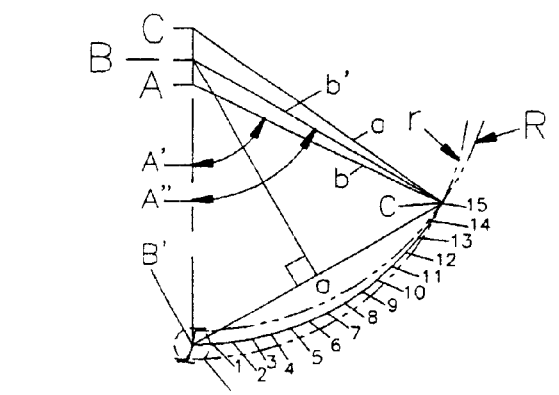
FIGS. 20a–20e are diagrams illustrating one method of generating novel addendum flank gear teeth according to the invention.

To generate the addendum form teeth according to the method shown in FIG. 20a, an arc of congruency is constructed extending from the pitch point B' of the internal/external gear set to the intersection C of the addendum circles of the internal/external gear-set. As will become apparent below, the arc of congruency B'C defines the radial outermost location of the point of contact of the teeth of the gear set as each tooth is rotated from the initial point of contact (intersection of the addendum circles) to the pitch point.

With A being the centre of the externally-toothed gear 118, B being the centre of the internally-toothed gear 116, r=0.7944 being the radius of curvature of the external gear 118, and R=0.8759 being the radius of curvature of the internal gear 116, the sides a, b and c of triangle ABC are respectively R, r and R−r=0.1630. With a diametric pitch of 24.57, the pitch circles of the gear-set are respectively R+1/24.57=0.9166 and r−1/25.47=0.7537 and the defining geometry of the arc of congruency B'C is derived as follows:

1. from the relationship between the sides and angles of a plane triangle:

$$s=(a+b+c)/2=(0.8759+0.7944+0.1630)/2=0.9166$$

$$\sin A=2/bc[s(s-a)(s-b)(s-c)]^{1/2},$$

$$=(2/(0.8759*0.1630))[(0.9166(0.9166-0.859)(0.9166-0.7944)(0.9166-0.1630)]=0.906080$$

$$A=115.03°, \text{ or}$$

$$\text{angle } A'=180-115.03=64.9°$$

2. from the Law of Cosines:

$$\text{side } a'=[b^2+c^2-2bc(\cos A')]^{1/2}=0.8322$$

3. from the Law of Sines:

$$\sin B'=b(\sin A/a)=0.89418, \text{ and angle } B'=59.88°$$

4. from the trigonometry of a right triangle:

$$b'=(a'/2)/(\sin(90-B')=0.8293 \text{ and}$$

$$\text{angle } A''=2(90-B')=60.23°$$

Since the arc of congruency B'C and the pitch circles of the gear-set with radii BB' and AB' intersect at the pitch point B', any point on circular arc B'C when rotated to the pitch point B' is related to a rotation of superimposed points on each gear of the set by a ratio of the radius of the arc of congruency to that of the respective radii of the pitch circles of the gears. This relationship is expressed in the following equations:

$$Ra=Rc(rc/ra)$$

$$Rp=Rc(rc/rp)$$

where Ra and Rp is the rotation of a superimposed point on the annulus and pinion gear, Rc is an angular displacement of a point on the arc B'C, and rc/ra and rc/rp are the ratios of the radii of the arc of congruency to the respective pitch circles of the annulus and pinion.

For example, consider point 15 of FIG. 20a, where, Rc=A''=60.23°, rc=b'=0.8293, ra=R+1/25.47=0.9166 and rp=r−1/25.47=0.7537.

$$Ra=60.23(0.8293/0.9166)=54.49°$$

$$Rp=60.23(0.8293/0.7537)=66.27°$$

Since point 15 by definition is a point of congruency common to each addendum flank of the gear-set, when point 15 on the circular arc B'C rotates to the pitch point B', a superimposed point on the annulus 116 will rotate 54.49° about centre B and a superimposed point on the ring gear will rotate 66.27° about centre A. It follows that when all fifteen points on the circular arc are rotated accordingly, they become the addendum flanks of the teeth of the gear-set and arc B'C is effectively a generating arc of congruency. Fully generated addendum flanks are shown in the breakout of FIG. 20b together with the dedendum flanks. The dedendum flanks are obtained by duplicating the addendum flank of the mating tooth with extension to the root circles of the gears with an appropriate fillet.

Figure 19B:
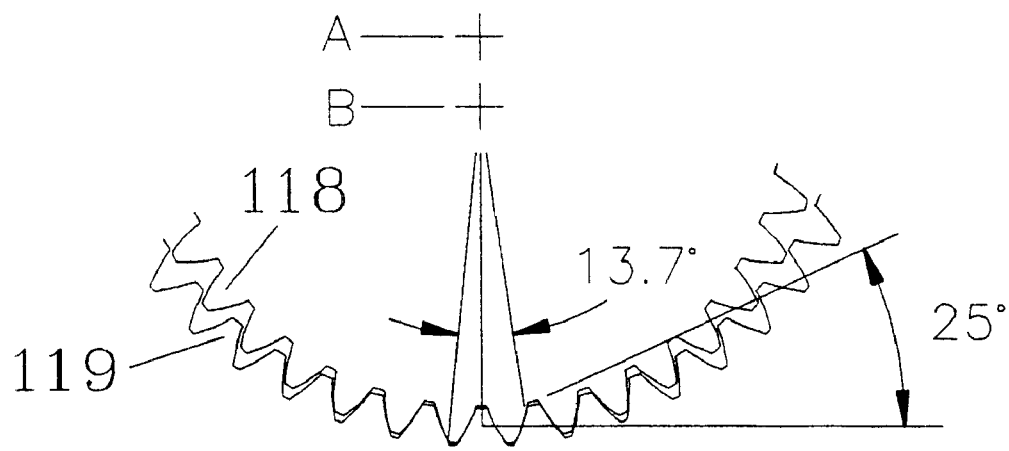

Since the arc of congruency passes between the addendum circles of both gears, gear teeth so generated have only addendum contact, and are unlike the teeth flanks of FIG. 19b which only have congruency between the dedendum of the internal gear and the addendum of the external gear during a portion of tooth contact and between the addendum of the internal gear and the dedendum of the external gear during the remaining portion of tooth contact. As a consequence, undercutting lessens tooth contact with involute form flanks, but not with the addendum form flanks as described herein since addendum form flanks have no dedendum flanks of congruency, only extended roots that do not interfere with tooth action.

Figure 20C:
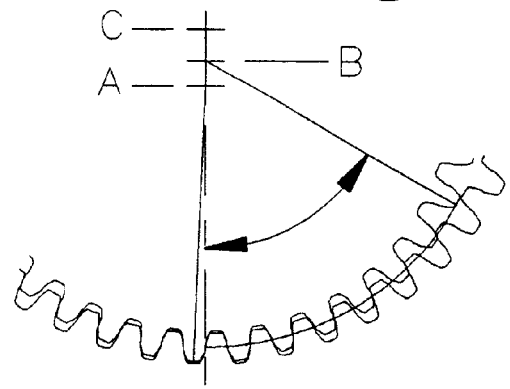
Figure 20B:
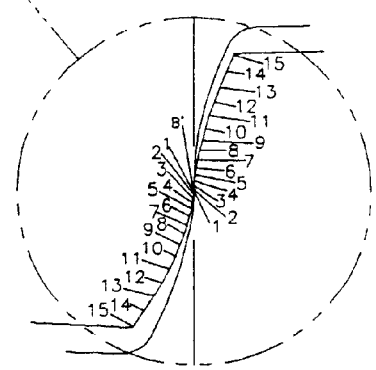

The angle of congruency A'' is shown in FIG. 20c. The contact ratio of teeth having such addendum form flanks is:

$$Tc=(1+41)(60.2/360)=7.02$$

which, when compared with above calculation for involute form flanks (d), is an increase in contact ratio by a very significant (7.02/1.60)=439%! Accordingly, the incorporation of addendum form gear teeth profiles can increase the load carrying capacity of gear sets to the equivalent of over four times that available from state-of-the-art involute flank teeth profiles.

Figure 20D:
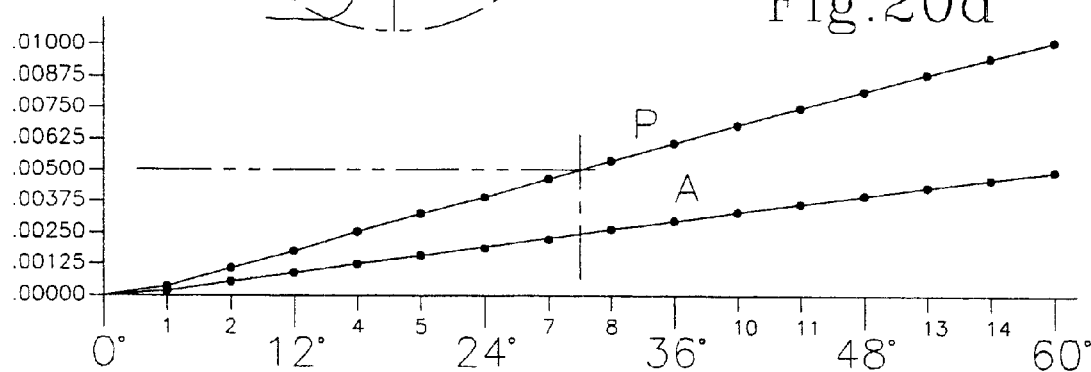

The graphs of FIG. 20d record the amount of sliding contact on the abscissa against rotation in degrees on the ordinate, as addendum flanks of the gear-set of FIG. 20c rotate in congruency to the pitch point. The points of locus P are obtained by a simple measurement of the sum of the distances between the points 0-1, 1-2, 2-3, 3-4, etc., to 14-15 on the generated flanks of the annulus and pinion as they rotate. For example, the sum of the sliding distance as the annulus and pinion rotate between the points of congruency 14-15 is a little over 0.01 non-dimensional units of length. The average sliding distance is shown at about 0.005 units of length and when multiplied by the total number of sliding increments 16 is 0.005*16=0.080, which is about equal to the radial displacement of the addendum circles from their pitch circles with a diametrical pitch of 24.57, 2/24.57= 0.081. The intermediate points on locus A are the measured sliding distance on the pinion flank and can be used to determine the relative sliding distance on each flank. Although the sliding distances appear to be the same, they vary by as much as 0.06%, which is a characteristic of addendum form flanks that are generated by arcs of congruency.

Figure 20E:
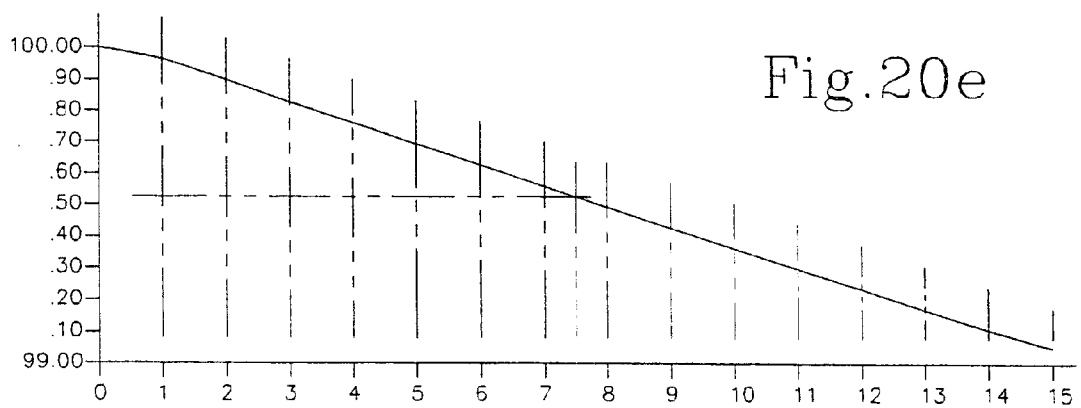

FIG. 20e, is a graph showing the incremental efficiency of the gear-set as continuum transfer takes place along the points 0-1, 1-2, 2-3, 3-4, etc., to 14-15 of the generated flanks. Percentage instantaneous efficiency is shown on the abscissa against congruent gear rotation on the ordinate and is as calculated from the following equations:

Efficiency=Work-Loss/Work

Work=$F*D$

Loss=$F*(cfs$ and/or $cfr)*(s$ and/or $r)$ where: F=force at pitch point, D=length of incremental rotation, cfs and cefr are sliding and rolling coefficients of friction, and s and r are the rolling and sliding distances. Tooth oil squish and bearing loads losses are not considered since such losses are irreverent to gear tooth flank efficiency.

With D=4°/360°(2*0.8293*pi)=0.0111(5.211)=0.0579, F=1, cfs=0.050 and cfr=0.003, the average efficiency is:

Work=1*0.0579=0.0579

Loss=1*0.050*0.005=0.00025

Efficiency=0.0579−0.00025/0.0579=99.56%

Since both the work done and the slope of the locus P are constant, it follows that tooth loss, a function of the sliding distance, will be a slope starting at the pitch point 0°, 0 of graph of FIG. 20e, where efficiency is 100% and falling through the calculated efficiency at the mid point, the average tooth efficiency of an addendum form tooth flank.

Figure 21A:
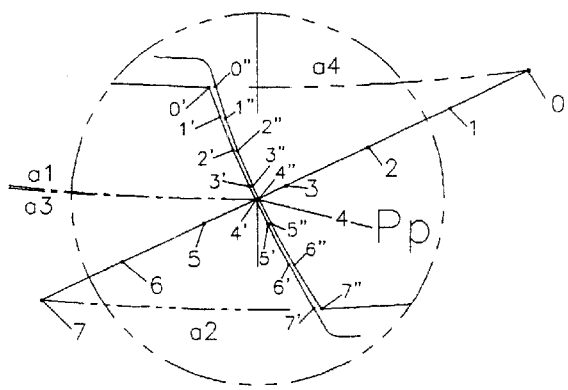
FIGS. 21a–21c are diagrams illustrating the efficiency of involute form gear teeth.
Figure 21B:
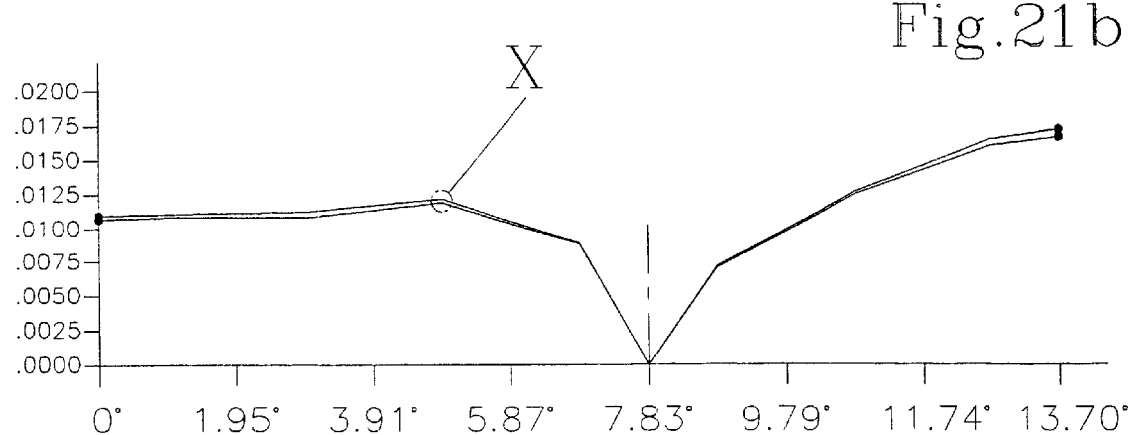
Figure 21C:
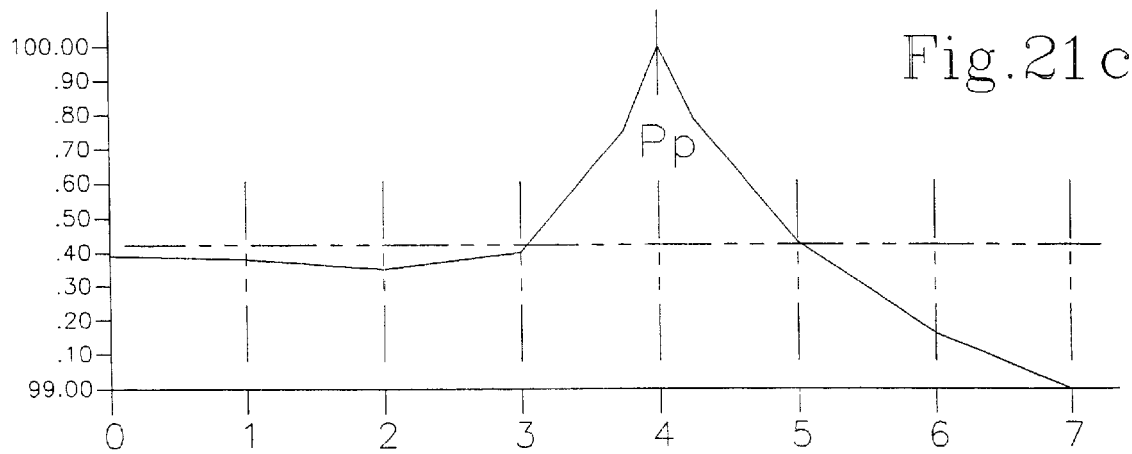

The efficiency of the addendum form teeth is comparable to the efficiency of standard involute form teeth. FIG. 21a shows 7 numbered points on involute generated tooth flanks of the gear-set. The length of congruent rolling contact between the points numbered from 0 to 7 on both the annulus and pinion, 0-1, 1-2, 2-3, etc., to 6-7 are plotted on the abscissa of the graph of FIG. 21b against base circle rotation of the gear-set on the ordinate. Sliding contact is ignored in the following tooth efficiency calculations, but it is a significant loss contributor in most cases since a sliding coefficient of friction can be as much as ten times that of a rolling coefficient which adds significantly to continuum loss with involute form tooth flanks.

With F=1, cfr=0.010, and D=1.95°/360°(2*0.8293*pi)= 0.00544(5.211)=0.02837, involute tooth efficiency is at point x:

Work=1*0.02837=0.02837

Loss=1*0.0080*0.0212=0.00017

Efficiency=0.02837−0.00017/0.02837=99.40%

When repeated for all seven points on the generated flanks, tooth flank contact efficiency will be as shown in FIG. 11c. The average involute flank efficiency is shown by the shadow line at about 99.42%.

Figure 22A:
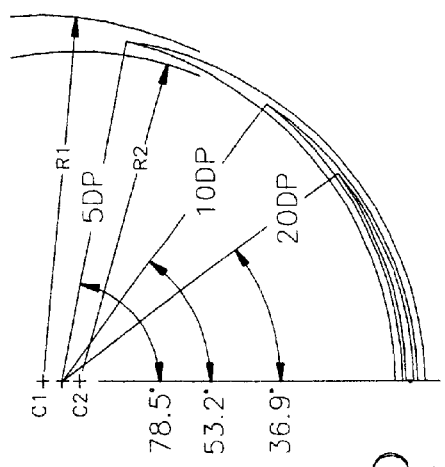
FIGS. 22a, 22b are diagrams illustrating the arcs of contact of addendum form flanks for different gear sets.
Figure 22B:
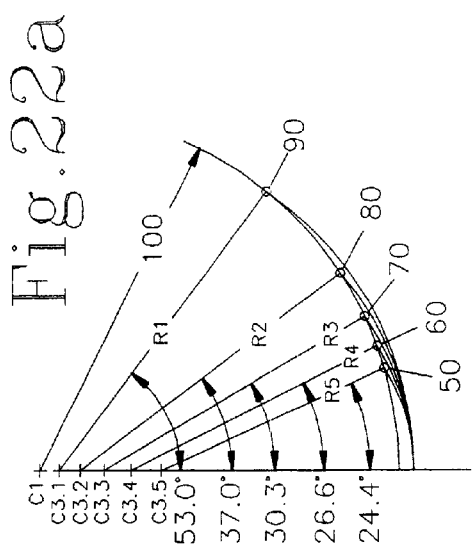

FIG. 22a illustrates the arcs of contact of addendum form flanks of five gear-sets comprising an internal gear having 100 teeth and external gears of 90, 80, 70, 60 and 50 teeth. FIG. 22b illustrates the arcs of contact of addendum form flanks of three gear sets with pitch circle diameters of 5 and 4.5 and diametric pitches of 5, 10 and 20. The five gear-sets of FIG. 22a have a contact ratio of 15.0, 10.3, 8.2, 6.9 and 6.1 and the three gear-sets of FIG. 22b have contact ratios of 6.2, 15.0 and 20.5. It can be concluded, therefore, that like any other tooth profiles, teeth contact decreases as gear ratio increases and increases as diametrical pitch increases, but with less sensitivity. As suggested by FIG. 22a, with ratios of less than 0.65 it would seem justified to conclude that coplanar gear-sets with contact ratios of five to eight and more can be achieved in most cases, that coplanar gear train loops with the same face widths can carry an equivalent tooth torque continuum as a three or four clustered simple reverted gear-train loop, and that coplanar gear train loops with the same overall length can carry a torque continuum of twice that of a three or four clustered simple-reverted-gear-train-loop.

Figure 23:
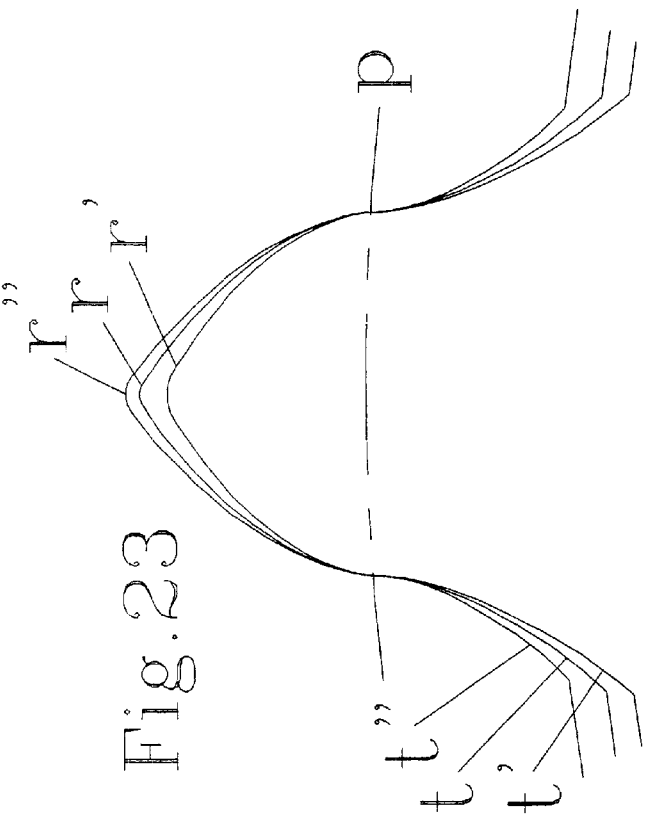
FIG. 23 is a cross-sectional view of an addendum form tooth as the arc of congruency is biased from centre.
Figure 25C:
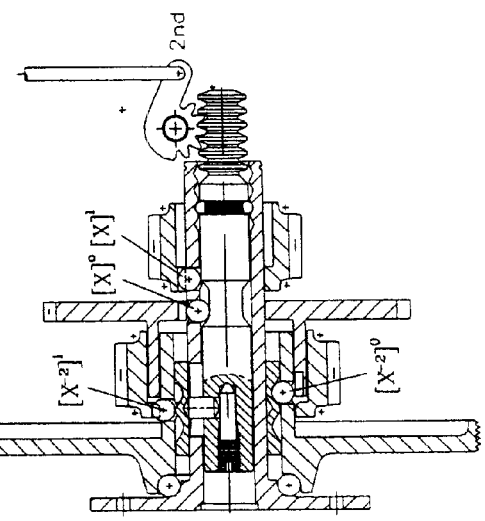
FIGS. 25a–25f are diagrams illustrating a layout of a four-speed wheel chair transmission with manual speed-change selection.
Figure 25E:
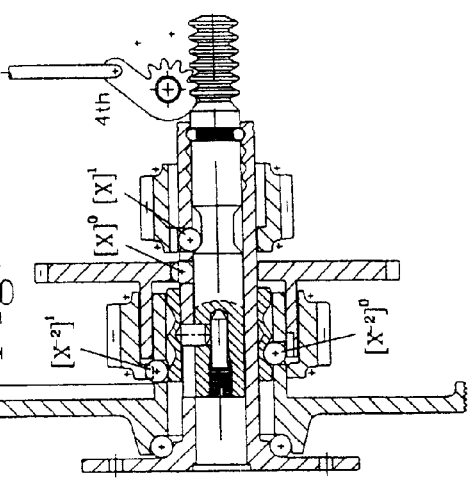
Figure 25B:
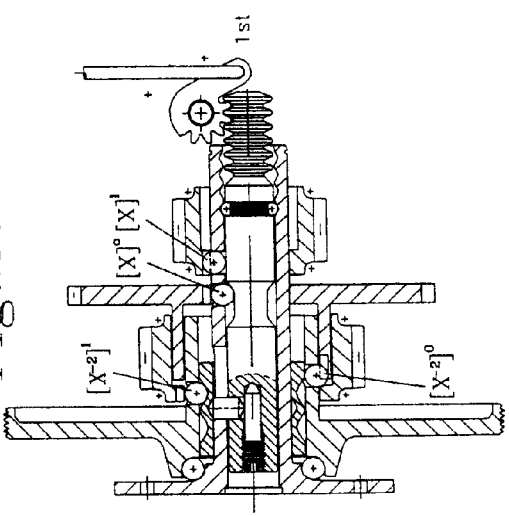
Figure 25D:
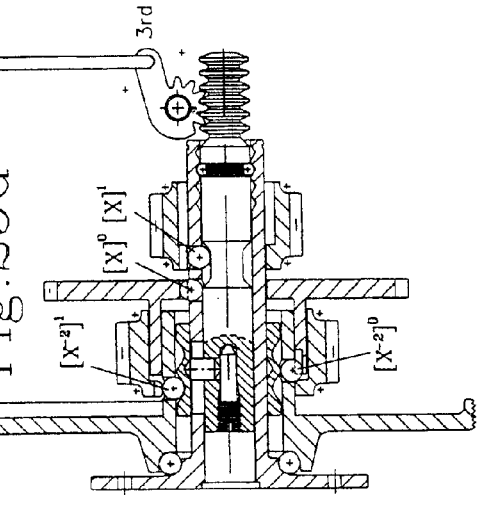
Figure 25A:
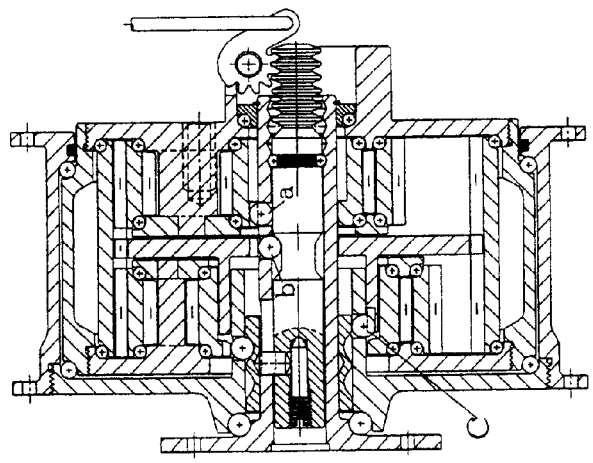
Figure 25F:
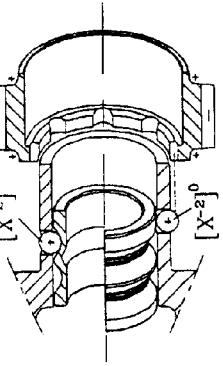
Figure 26A:
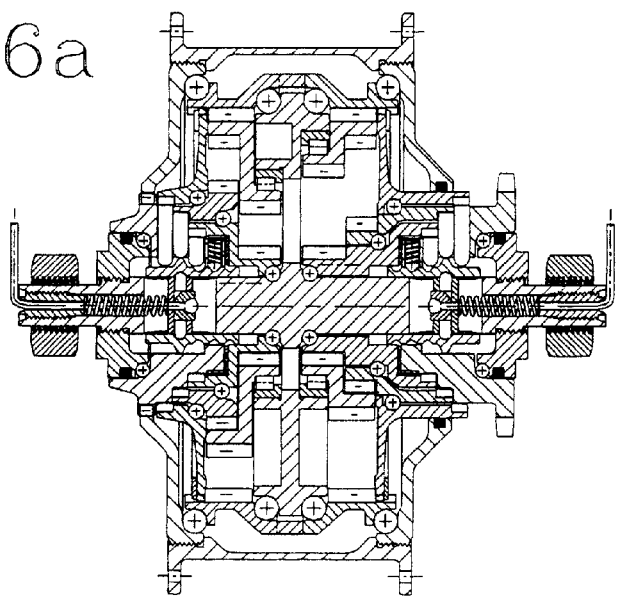
FIGS. 26a–26e are diagrams illustrating a layout of a three-speed, three-range bicycle wheel-hub transmission with on-the-go shift capability.
Figure 26B:
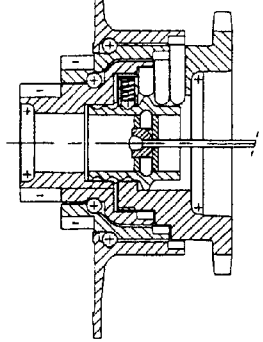
Figure 26C:
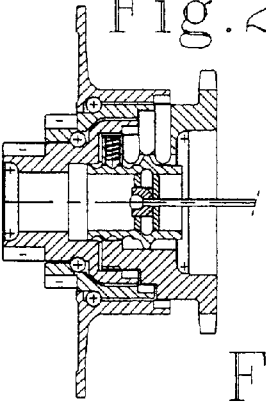
Figure 26D:
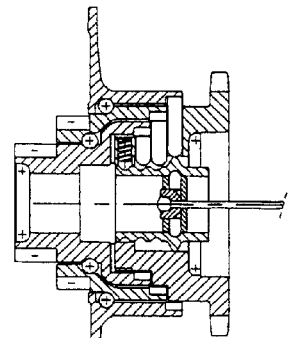
Figure 26E:
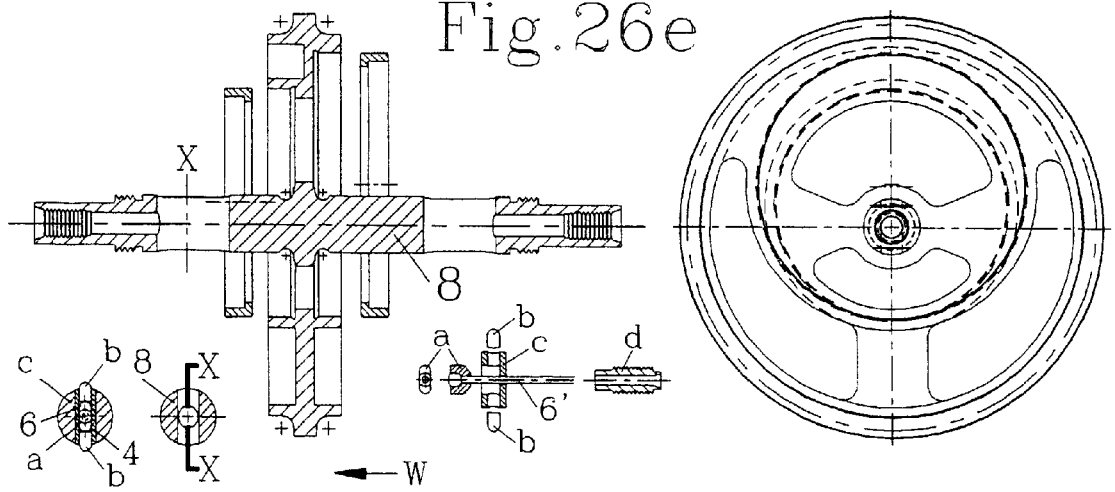

FIG. 23 illustrates the generated addendum tooth profile as the centre of the arc of congruency is biased from away the midpoint of the centres of the two gears. As shown by lines e, f therein, a bias ratio over 50% tends to stub the addendum, elongate the root of the ring gear 108, elongate the addendum and stub the dedendum of the annulus 106. A shown by lines g, h therein, a bias ratio under 50% tends to elongate the addendum, stub the root of the ring gear 108, stub the addendum and elongate the dedendum of the annulus 106.

One characteristic of addendum form teeth generated using a single arc is that such teeth slide more at some points along the arc of congruency than at other points. FIG. 24 illustrates a method of generating addendum form teeth which have equal sliding, whereby all points on a locus beginning at the point of intersection of the addendum circles and ending at their pitch point, are described by equally spaced intersecting off-set arcs concentric with and bounded by their addendum circles. Six such points are shown in the breakout of FIG. 24b. The procedure used to transfer such points to form the addendum form flanks is similar to that used in the transfer of point 15 in the discussion of FIG. 20a. Since all points on the locus have a specific radius and centre location on a line joining the centres A and B, as shown in the breakout of FIG. 24c, they are unlike the points of congruency on the arc of FIG. 20a where all points have a common centre. Every point describing a generating locus has a bias ratio as defined above.

FIG. 25 illustrates the schematic layout of an automotive transmission with sixteen forward and eight reverse speeds that consists of a series arrangement with a four-speed assembly of FIGS. 12–2:5, two, two-speed assemblies of FIG. 5a and FIG. 5d, together with a differential assembly of FIG. 17.

FIG. 26 illustrates a layout of a four-speed wheel chair transmission with a manual on-the-go speed-change selection mechanism. Input flange 1 attaches to a handwheel and the casing 9 attached to 9a is a wheel-hub output of the assembly. Two coplanar loops are provided that share a common annulus 4–4' with a centre web 4a which when coupled to input flange 1 changes a 1st ratio-state of an input loop structure with pinion/cluster 2'–3' from $X^1$ to $X^0$, and when coupled to output flange 9a changes a 1st ratio-state of an output loop structure with pinion/cluster 2-3 from $X^2$ to $X^0$. FIG. 26a shows a radial displacement of a ball ratchet as a ratio change $[X^{-2}]^0$ to $[X^{-2}]^1$ is activated by an axial movement of cam 7 so that the ball protrudes through the holes on flange 1 to engage tooth spline 2a on the output pinion 2. FIGS. 26b to 26e show the four positions of spindle 6 as caused by the ratchet action of a sector gear 8 and a circular rack end of the spindle. The following expressions record the four output/input ratio-states of the wheel-chair transmission as a function of the number of teeth on each gear-pair of the combination, 1st=(24/37)(47/60) - - - 0.508
2nd=(24/37)(37/47)(60/53)(43/36)=0.690
3rd=1/1 - - - =1.00
4th=(60/53)(43/36) - - - =1.352 with an overdrive ratio and an overall range of 1.352/0.508= 2.661.

FIG. 27 is a cross-section layout of a sixteen-speed increasing bicycle hub transmission with on-the-go shift capability. A first coplanar loops of FIG. 5d, in series with three similar loops of FIG. 5c, with a cage of said first loop an output to the annulus of a second loop, with annuli of all loops an input component. Pinions and annulus of all adjacent loop transfer continuum to the wheel hub, with cage member of the three last loops reactive members. The crescents of the first three loops and the pinion of a last loop are each provided with ratchet type one-way clutching mechanisms with orientation so that when their reactive members are free, the loops become a solid coupling with 2nd ratio-states of unity. However, when a reactive members is coupled to a non-rotating centre structure of the transmission by radially engaging ball splines, caused by an interaction between a rotatable cam and axially movable followers associated with each reactive member, 1st and 2nd ratio-states of each loop when combined in all combinations of product provide a bicycle transmission with sixteen speeds.

FIGS. 28a–28f illustrate a method of generating addendum flank gear teeth for a double ring/annulus gear set with ring gears have unequal numbers of teeth, such as in the four-speed wheel chair transmission shown in FIG. 26. FIG. 28a is a cross-sectional view of the coplanar reverted gear train loops of the transmission 2000 of FIG. 26, showing the first ring gear 2018a, the second ring gear 2018b, and the annulus 2016. Initially, the annulus 2016 and the first ring gear 2018a are formed with addendum form teeth, as described herein. FIG. 28b is an end view of the transmission 2000 showing the annulus 2016 and the first ring gear 2018a, respectively having 60 internal addendum form teeth and 47 external addendum form teeth.

FIG. 28c is an end view of the transmission 2000 showing the annulus 2016 and the second ring gear 2018b, with the second ring gear 2018b having external 53 teeth. The second ring gear 2018b is formed with corresponding addendum form teeth by using the arc of congruency, shown in FIG. 28d, used in forming the gear teeth of the annular gear 2016 and the first ring gear 2018a, to generate a new arc of congruency, shown in FIG. 28e. One method of generating the arc of congruency, shown in FIG. 28e, involves (1) generating a first arc extending from a point on the addendum of the annular gear 2016 tooth flank located a set distance from the pitch point and having as its centre the centre of the annular gear 2016, (2) generating a second arc extending from a point on the addendum of the annular gear 2016 tooth flank located the set distance from the pitch point but on the opposite side of the pitch point and having as its centre the centre of the ring gear 2018b, (3) intersecting the first arc with the second arc to define a point of congruency, (4) generating an arc of congruency extending between the first and second arcs, from the pitch point to the addendum contact point, (5) calculating the polar coordinates of the addendum contact point using the radius of the arc of congruency, as described with reference to FIG. 20a, and (6) repeating steps (1) to (5) over a number of points on the addendum flank of the annular gear 2016 to obtain a sufficient number of polar coordinates to define the shape of the addendum flank of the ring gear 2018b.

It will be appreciated that the method of FIG. 28 can be used to develop addendum flank gear teeth which has sliding contact with any pre-fabricated gear, including an involute gear, and for any arrangement of gear and pinion. FIG. 28f (k1) shows that by using the above method to mate an addendum flank gear to an involute gear, rather than to another involute gear, and extra 5.7 degrees of contact is obtained. FIG. 28f (k2) shows that the angle of contact increases from 15.5 degrees to 29.6 degrees by using the method of FIG. 28 with a gear and pinion.

The description of the preferred embodiments herein is intended to be illustrative, rather than exhaustive of the present invention. Those persons of ordinary skill will be able to make certain additions, deletions and/or modifications to the described embodiments without departing from the spirit or scope of the invention, as defined by the appended claims.

I claim:

1. A binary clutch for varying a gear ratio of an incrementally-variable transmission, the transmission including a transmission housing and a coplanar reverted gear train loop disposed within the housing, the coplanar reverted gear train loop comprising an inner annular gear, a cage disposed within the annular gear, and a pinion disposed within the cage, the cage including a ring gear having an outer toothed surface meshing with the annular gear and an inner toothed surface meshing with the pinion, the binary clutch being disposed within the transmission housing and comprising:

a pair of clutch members, each said clutch member including a set of concentric grooves disposed on a respective face thereof, one of the clutch members being coupled to the transmission housing, another one of the clutch members being coupled to one of the annular gear, the cage and the pinion;

an interactive member disposed between the clutch members, the interactive member including a pair of opposite surfaces, a first of the opposite surfaces including a plurality of concentric grooves for meshing with one of the groove sets, a second of the opposite surfaces including a plurality of concentric grooves for meshing with another of the groove sets, the interactive member being coupled to another one of the annular gear, the cage and the pinion; and a clutch actuator coupled to the interactive member for moving the interactive member between a first position engaging a first of the clutch members and a second position engaging a second of the clutch members, in the first position the clutch actuator establishing in the coplanar gear train loop a first gear ratio, in the second position the clutch actuator establishing in the coplanar gear train loop a second gear ratio.

2. The binary clutch according to claim 1, wherein the clutch members and the interactive member comprise clutch discs, the clutch member faces comprising parallel faces, the interactive member surfaces comprising parallel surfaces parallel to the parallel faces.

* * * * *